United States Patent [19]
Yesnik

[11] Patent Number: 5,639,804
[45] Date of Patent: Jun. 17, 1997

[54] NON-SATURATED FRICTION MATERIAL COMPRISING POWDERED SILICONE RESIN AND POWDERED PHENOLIC RESIN AND METHOD FOR MAKING SAME

[75] Inventor: Marc A. Yesnik, Glen Ellyn, Ill.

[73] Assignee: Borg-Warner Automotive, Inc., Sterling Heights, Mich.

[21] Appl. No.: 620,484

[22] Filed: Mar. 22, 1996

Related U.S. Application Data

[63] Continuation of Ser. No. 126,000, Sep. 23, 1993, abandoned.

[51] Int. Cl.⁶ .................................................. C08J 5/16
[52] U.S. Cl. ...................... 523/156; 523/153; 523/155; 524/15; 524/34
[58] Field of Search ............................... 523/153, 155, 523/156; 524/15, 34

[56] References Cited

U.S. PATENT DOCUMENTS

| | | | |
|---|---|---|---|
| 3,270,846 | 9/1966 | Arledter et al. | 192/107 R |
| 3,306,401 | 2/1967 | Dasse | 188/251 M |
| 3,365,041 | 1/1968 | Stormfeltz | 192/107 M |
| 3,390,750 | 7/1968 | Albertson | 192/107 M |
| 3,429,766 | 2/1969 | Stormfeltz | 428/37 |
| 3,520,390 | 7/1970 | Bentz | 192/107 R |
| 3,647,722 | 3/1972 | Albertson et al. | 264/127 |
| 3,703,224 | 11/1972 | Bray | 188/251 M |
| 4,226,816 | 10/1980 | Yamamoto et al. | 264/29.4 |
| 4,256,801 | 3/1981 | Chuluda | 428/280 |
| 4,262,788 | 4/1981 | Yamamoto et al. | 192/107 M |
| 4,278,584 | 7/1981 | Noguchi et al. | 523/156 |
| 4,279,696 | 7/1981 | Piersol | 162/146 |
| 4,336,305 | 6/1982 | Tanaka | 428/336 |
| 4,349,595 | 9/1982 | Trainor et al. | 428/64 |
| 4,374,211 | 2/1983 | Gallagher et al. | 523/156 |
| 4,387,079 | 6/1983 | Kasai et al. | 423/344 |
| 4,504,543 | 3/1985 | Yamashita et al. | 428/338 |
| 4,722,949 | 2/1988 | Horiguchi et al. | 523/153 |
| 4,743,634 | 5/1988 | Royer | 523/150 |
| 4,935,214 | 6/1990 | Pugar et al. | 423/324 |
| 5,041,471 | 8/1991 | Brinzey | 523/153 |
| 5,048,654 | 9/1991 | Yesnik | 192/70.14 |
| 5,395,864 | 3/1995 | Miyoshi et al. | 523/155 |
| 5,453,317 | 9/1995 | Yesnik | 428/283 |

FOREIGN PATENT DOCUMENTS

| | | |
|---|---|---|
| 0123312 | 10/1984 | European Pat. Off. |
| 4205645 | 8/1993 | Germany .................. C08J 5/14 |
| 4205645A1 | 8/1993 | Germany . |
| 60-28484 | 2/1985 | Japan .................. C09K 3/14 |
| 526271 | 2/1993 | Japan .................. F16D 69/02 |
| 2163784 | 3/1986 | United Kingdom . |
| 2205592 | 12/1988 | United Kingdom . |

OTHER PUBLICATIONS

Publication No. JP60028484 Abstract; Feb./1985.
Derwent Abstract JP5026271; Feb./1993.
European Patent Search Report.

*Primary Examiner*—Paul R. Michl
*Assistant Examiner*—John J. Guarriello
*Attorney, Agent, or Firm*—Emch, Schaffer, Schaub et al; Greg Dziegielewski

[57] ABSTRACT

The present invention relates to a friction material comprising a silicone resin, a phenolic resin, and, in certain embodiments, silicon nitride particles, incorporated into an aqueous paper formulation which is then formed into a friction material. The friction material is prepared by mixing the silicone resin, the phenolic resin (and, in certain embodiments, silicon nitride particles) into a raw paper formulation, forming a porous friction material, and heating the friction material to cure the phenolic resin and silicone resin.

19 Claims, 14 Drawing Sheets

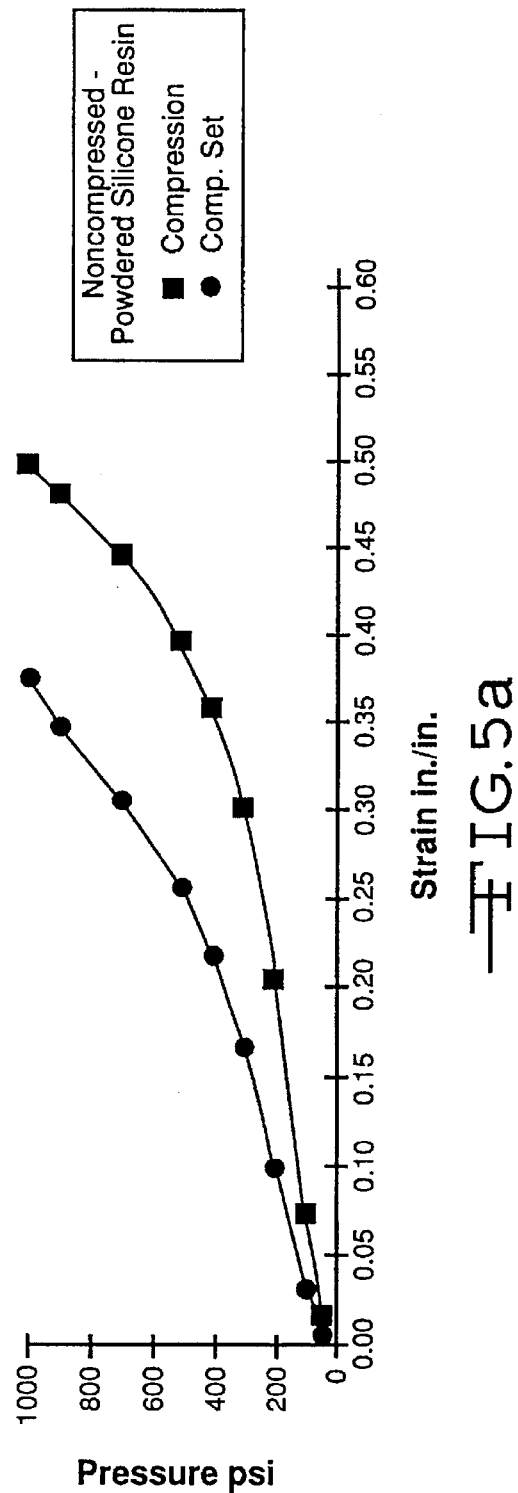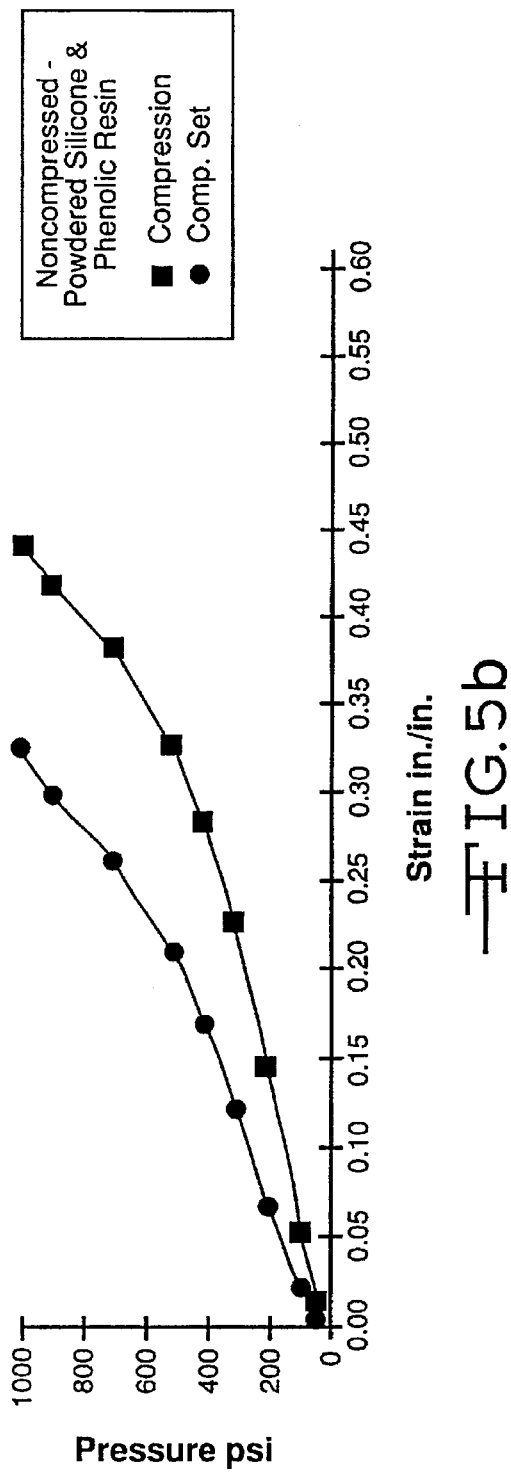

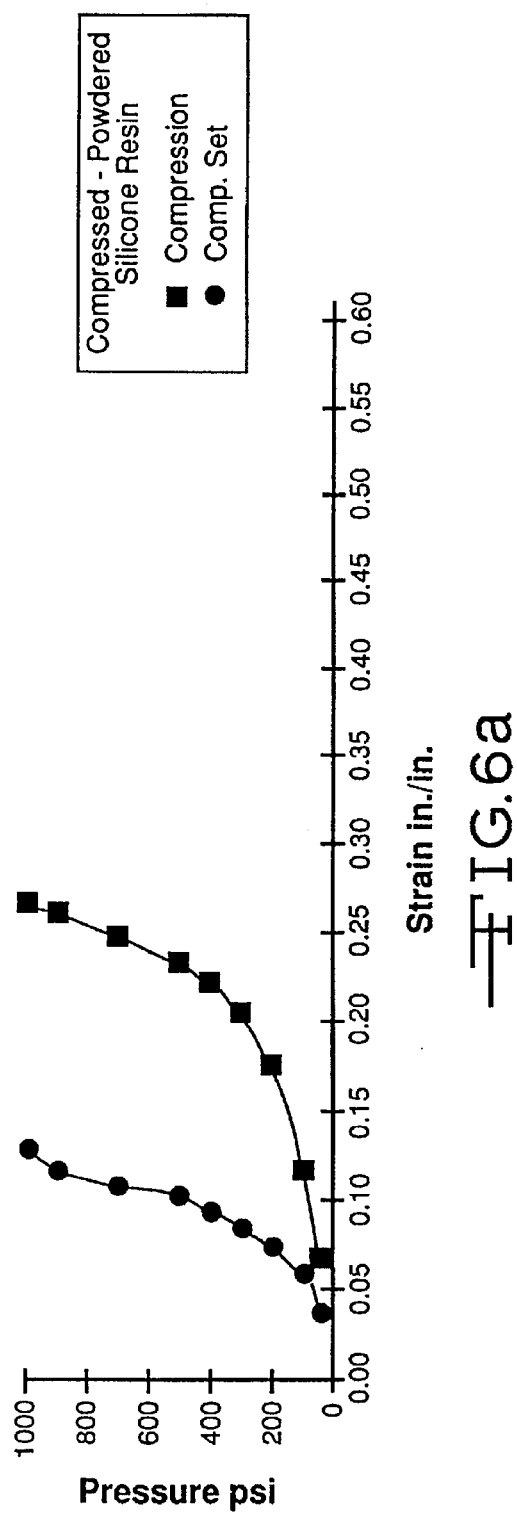
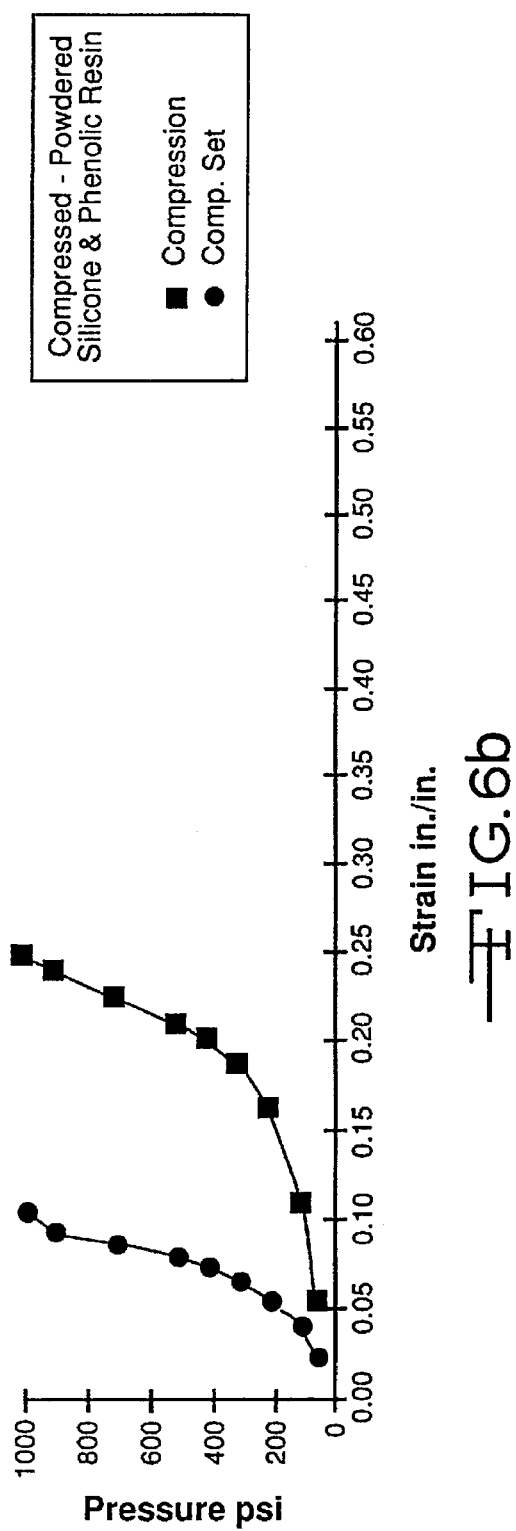

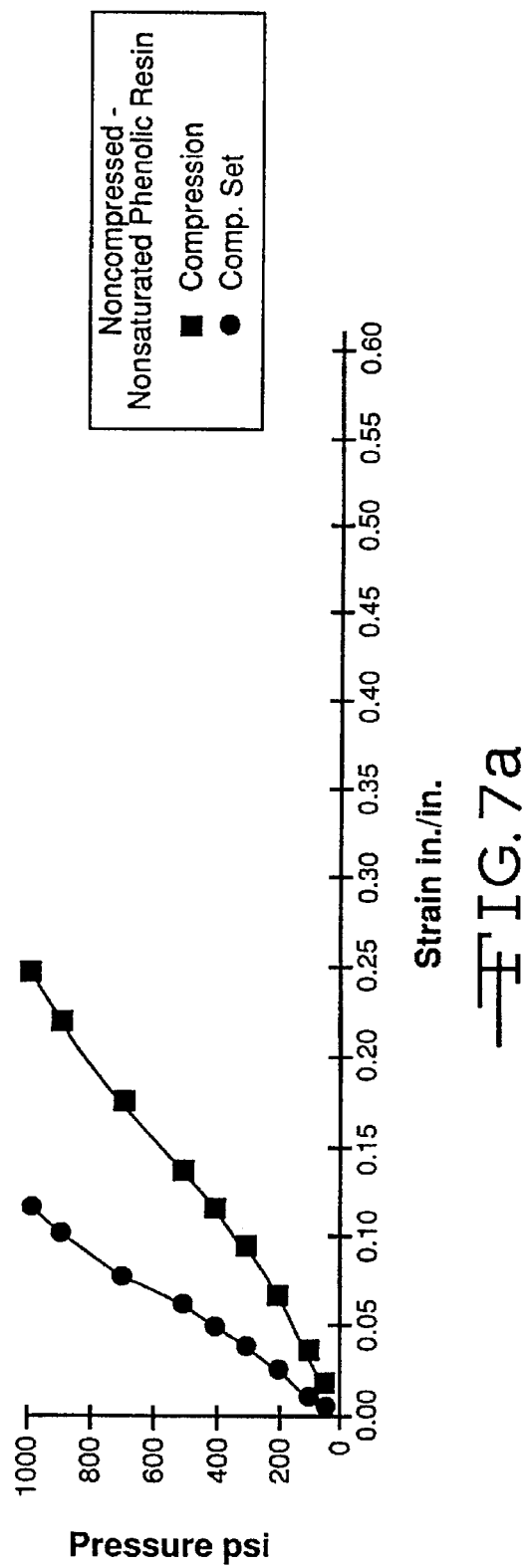
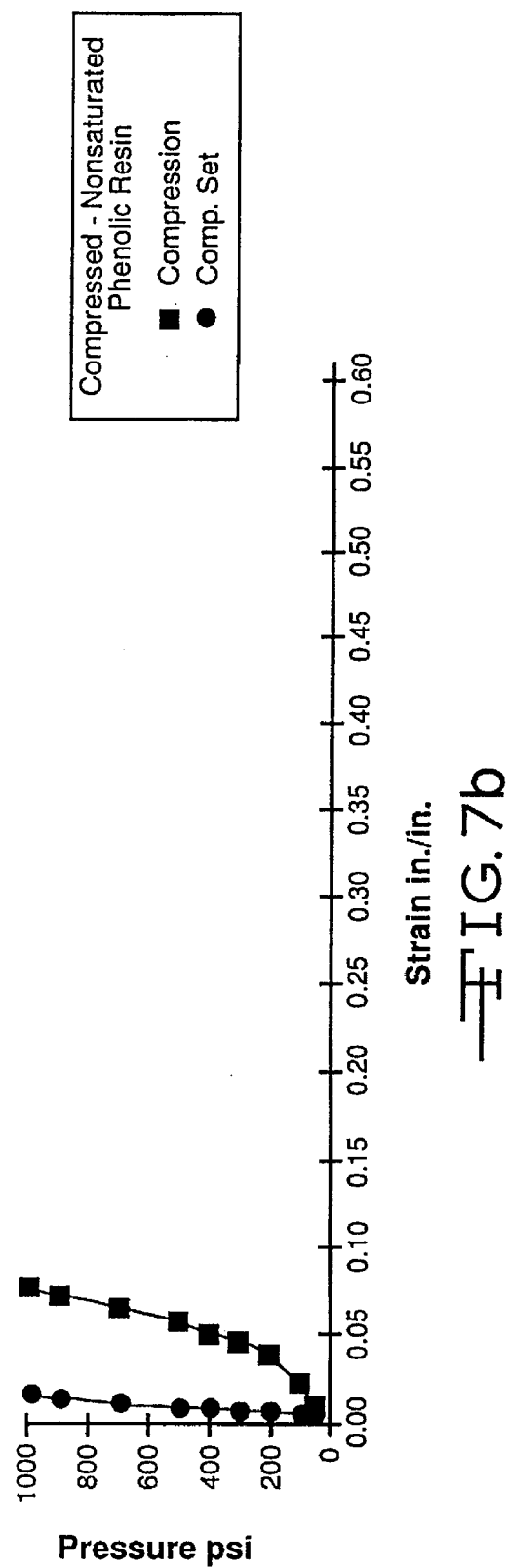
FIG.7a
FIG.7b

NON-SATURATED FRICTION MATERIAL COMPRISING POWDERED SILICONE RESIN AND POWDERED PHENOLIC RESIN AND METHOD FOR MAKING SAME

This application is a continuation of application Ser. No. 08/126,000 filed on Sep. 23, 1993 now abandoned

TECHNICAL FIELD

The present invention relates to a method for making non-asbestos friction materials and the friction materials produced thereby. In particular, the friction material comprises a non-impregnated paper which comprises fibrous materials, at least one particulate silicone resin, at least one particulate phenolic resin (and, in certain embodiments, silicon nitride) and, optionally, other materials, fillers and inert materials such as diatomaceous earth and solid cashew nut oil particles. The friction material is useful in high energy applications and has an increased coefficient of dynamic friction over conventional friction materials.

BACKGROUND ART

New and advanced transmission systems and braking systems are being developed by the automotive industry. These new systems often involve high energy requirements. Therefore, the friction materials technology must also be developed to meet the increasing energy requirements of these advanced systems.

The friction material must have high heat resistance in order to be useful in the new transmission and braking systems. Not only must the friction material remain stable at high temperatures, it must also be able to rapidly dissipate the high heat that is generated during operating conditions.

The high speeds generated during engagement and disengagement of the new transmission and braking systems mean that a friction material must be able to maintain a relatively constant frictional engagement throughout the engagement and disengagement of the friction material. It is important that the frictional engagement be relatively constant over a wide range of speeds and temperatures in order to minimize "grabbing" of materials during braking or "shuddering" of the transmission system during power shift from one gear to another.

In particular, the new high energy friction material must be able to withstand high speeds wherein surface speeds are up to about 14,000 feet/minute. Also, the friction material must be able to withstand high energy pressures up to about 700 psi. It is also important that the friction material be useful under limited lubrication conditions and also be able to withstand the extreme pressures and speeds applied during use.

Previously, asbestos fibers were included in friction materials. For example, the Arledter et al. U.S. Pat. No. 3,270,846 patent describe phenolic and phenolic-modified resins in asbestos-filled friction materials. Now, however, due to health and environmental problems, asbestos is no longer being used. However, friction materials without the presence of asbestos not only encountered structured integrity problems during processing, but also lacked the thermal stability which the asbestos provided. More recent friction materials have attempted to overcome the absence of the asbestos in the friction material by impregnating the paper or fiber materials with phenolic or phenolic-modified and other new resins. Attempts to overcome the limitations and drawbacks of phenolic resin impregnated friction materials include the replacement of phenolic resins with other thermosetting resins as the impregnating resin. One attempt to produce friction materials involves the modification of a phenolic resin with various synthetic resins, as described in the Takarada et al. U.S. Pat. No. 4,657,951. These friction materials, however, do not rapidly dissipate the high heat generated during use, which then contributes to reduced heat resistance and unsatisfactory coefficient of friction performance.

While phenolic resins are conventionally used as an impregnant in friction materials for "wet" applications, the phenolic resins have various limitations. The phenolic resin-impregnated friction materials do not have the high heat resistance necessary for use with the new high energy transmission systems. In particular, the phenolic resins in the impregnated friction material tend to carbonize at a temperature of about 450° C. which is too low to be useful in high energy applications. In addition, phenolic resins are rigid materials and when the phenolic resins are used as an impregnant in a friction material, uneven lining wear and separator plate "hot spots" are more likely to result if uniform contact between friction materials is not obtained.

In the past, the friction materials were made by impregnating a friction paper with a suitable solvent-based impregnating resin and heating the impregnated paper to cure the resin. The solvent material must be evaporated off and collected in an environmentally sound manner. Further, during the evaporation of the solvent, the impregnating resin tends to migrate to the surface of the paper. This migration provides an uneven distribution of the impregnating resin in the friction paper material.

It is important that both the physical properties and the frictional characteristics of friction material remain intact during the expected service period of a friction material. A friction material impregnated with a brittle resin may crack under a heavy load and collapse the open structure of the friction paper lining matrix. On the other hand, a friction material impregnated with an elastomeric resin would provide desired friction torque, but lacks the wear resistance and the strength required to hold the friction paper matrix intact.

In order for friction materials to be useful, the friction material must have a wide variety of acceptable physical characteristics. The friction material must be resilient (or elastic) yet resistant to compression set, abrasion and stress, have high heat resistance and be able to dissipate heat quickly. The friction material must also have long lasting, stable and consistent frictional performance. If any of these characteristics are not present, optimum performance of the friction material is not met.

It is also important that the friction material be porous and possess uniform absorbency, and also have good tensile and shear strengths when saturated with brake lubricant or transmission fluid during use. In selected applications, it is also important that the friction material have a low density and high porosity such that there is a high fluid absorbency capacity during use. Thus, it is important that the friction material not only be porous, but also be flexible and compressible. The fluids absorbed into the friction material must be capable of being squeezed or released from the friction material quickly under the pressures applied during operation of the brake or transmission. It is also important that the friction material have high thermal conductivity to also help rapidly dissipate the heat generated during operation of the brake or transmission.

In view of the need for a better friction material, and as a result of extensive research, a new friction material with improved characteristics has now been developed. As far as is known, there is no disclosure of a friction material for use in "wet" applications wherein the friction material is made by adding a powdered phenolic resin and a powdered silicone resin (and, in certain embodiments, a silicon nitride) to a mixture of fibrous material to form a friction material.

Until the present invention, there has been no disclosure or suggestion that a powdered silicone resin and a powdered phenolic resin material (and, in certain embodiments, powdered silicon nitride) could successfully be blended with fibrous materials and other raw paper ingredients used in the slurry during the paper making process of friction materials. The friction material of the present invention eliminates the need for impregnating a porous fibrous base material with an impregnating resin.

Previous attempts to use silicone resins in friction materials have not had good acceptance in the friction lining industry. A friction lining that is impregnated or saturated with a silicone resin typically has poor shear strength and delamination resistance. Further, in the previously made friction linings the silicone resin tends to cause the friction lining to be too elastic which then creates undesirable friction characteristics. Therefore, it is not surprising that friction lining compositions formed entirely of a phenol-formaldehyde resin-polysiloxane resin have not been used successfully. Such compositions do not have the necessary constant coefficient of friction characteristics and thus fail under high energy and high heat conditions.

Until the present invention, there has been no disclosure or suggestion that powdered resins could be directly added to a raw paper formulation for use as a "wet" friction material. "Wet" friction materials are used in applications where the material is usually at least partially lubricated with the liquid used in wet brakes or an automatic transmission fluid, or other such media. During use of the "wet" friction material, the fluid is alternately squeezed from or is impregnating the friction material. Wet friction materials differ greatly in both their composition and physical characteristics from "dry" friction materials.

The surface chemical and mechanical interface tribological phenomenon of "wet" and "dry" materials contributing to performance are different. This refers to interface of friction material and steel separator plates which are in contact.

Accordingly, it is an object of the present invention to provide an improved friction material with reliable and improved properties compared to those of the prior art.

A further object of this invention is to provide friction materials with high thermal conductivity, porosity and strength.

DISCLOSURE OF THE INVENTION

In order to achieve the requirements discussed above, many friction materials were evaluated for friction and heat resistant characteristics under conditions similar to those encountered by friction materials during operation. Commercially available brake linings and transmission materials were investigated and proved not to be suitable for use in the new high energy applications currently being developed by the automotive industry.

The present invention relates to a novel non-asbestos friction material which is especially useful in wet friction applications such as brake and clutch applications. It has now been discovered that when a powdered silicone resin and a powdered phenolic resin (and, in certain embodiments, silicon nitride particles) are blended or mixed with an aqueous paper slurry of fibrous materials and formed into a friction material, a high energy friction material is formed. Such high energy friction material has surprisingly high frictional stability and high heat resistance.

In the present invention, there is no need to saturate a porous fibrous base material with an impregnating resin. Rather, the amount of resin desired in a friction material is established by adding a predetermined concentrations of powder silicone and phenolic resin materials into a raw paper slurry of fibrous materials. The powder resin particles are incorporated directly into the slurry during the paper making process. The powder phenolic and silicone resin particles are added to the entire paper formulation. These resin particles remain insoluble and disperse well into the raw paper slurry. As the fibrous base material is formed, the resin particles are mixed into a homogeneous blend with the other ingredients. After the fibrous base material is formed, heat is applied to cure the resins. Simultaneously, pressure is also applied to bring the friction material to the desired final lining thickness or density, and bond the friction material to the supporting steel (or other such material) core backing plate. In the early stages of the cure, the resins flow, and depending on the concentration of resins, coats the ingredients in the fibrous base material. In certain embodiments, the final friction material comprises about 3–80%, by weight, phenolic resin and about 10 to about 80%, by weight, silicone resin material.

According to the present invention, since no impregnating resin is involved, the non-saturated friction material cures differently from a saturated friction material. Migration of any solvent present in the fibrous base material out of fibrous base material can be influenced by the rate of heating, the concentration of resin, and the type of solvent present. Further, the molecular weight of the resins can affect the distribution gradient of the resins from the center to either side of the paper materials. Thus, according to the present invention, when the phenolic resin and silicone resin are present in the fibrous base material there is a more uniform distribution of resin throughout the friction materials.

The non-saturated silicone-phenolic resin based friction material of the present invention shows as much as a 25% dynamic friction coefficient increase over saturated friction materials with no substantial increase in lining wear. Further, the static coefficient of friction for the non-saturated material of the present invention is comparable to conventional saturated materials. In addition, the low static to dynamic friction ratios indicate a smoother or more consistent performance during engagement of the friction material.

The non-saturated silicone-phenolic resin based friction material of the present invention prevents uneven wear of the friction material, and "hot spots" on the separator plates from developing during the useful life of the friction material. When there is little uneven wear on the friction material, there is a more "steady state" wear on the clutch or brake and therefore, more consistent performance of the clutch or brake. Further, the friction material of the present invention shows good shear strength such that the friction material resists delamination during use.

BRIEF DESCRIPTION OF THE FIGURES

FIG. 5a is a graph comparing the compression and compression or permanent set for a non-compressed friction material comprising a powdered silicone resin.

FIG. 5b is a graph comparing the compression and compression or permanent set for a non-compressed friction material comprising a powdered silicone resin and a powdered phenolic resin.

FIG. 6a is a graph comprising the compression and compression or permanent set for a compressed friction material comprising a powdered silicone resin.

FIG. 6b is a graph comparing the compression and compression or permanent set for a compressed friction material comprising a powdered silicone resin and a powdered phenolic resin.

FIG. 7a is a graph comparing the compression and permanent set for a non-compressed conventional friction material saturated with a phenolic resin.

FIG. 7b is a graph comparing the compression and permanent set for a compressed convention friction material saturated with a phenolic resin.

BEST MODE Of CARRYING OUT THE INVENTION

Figure 1:
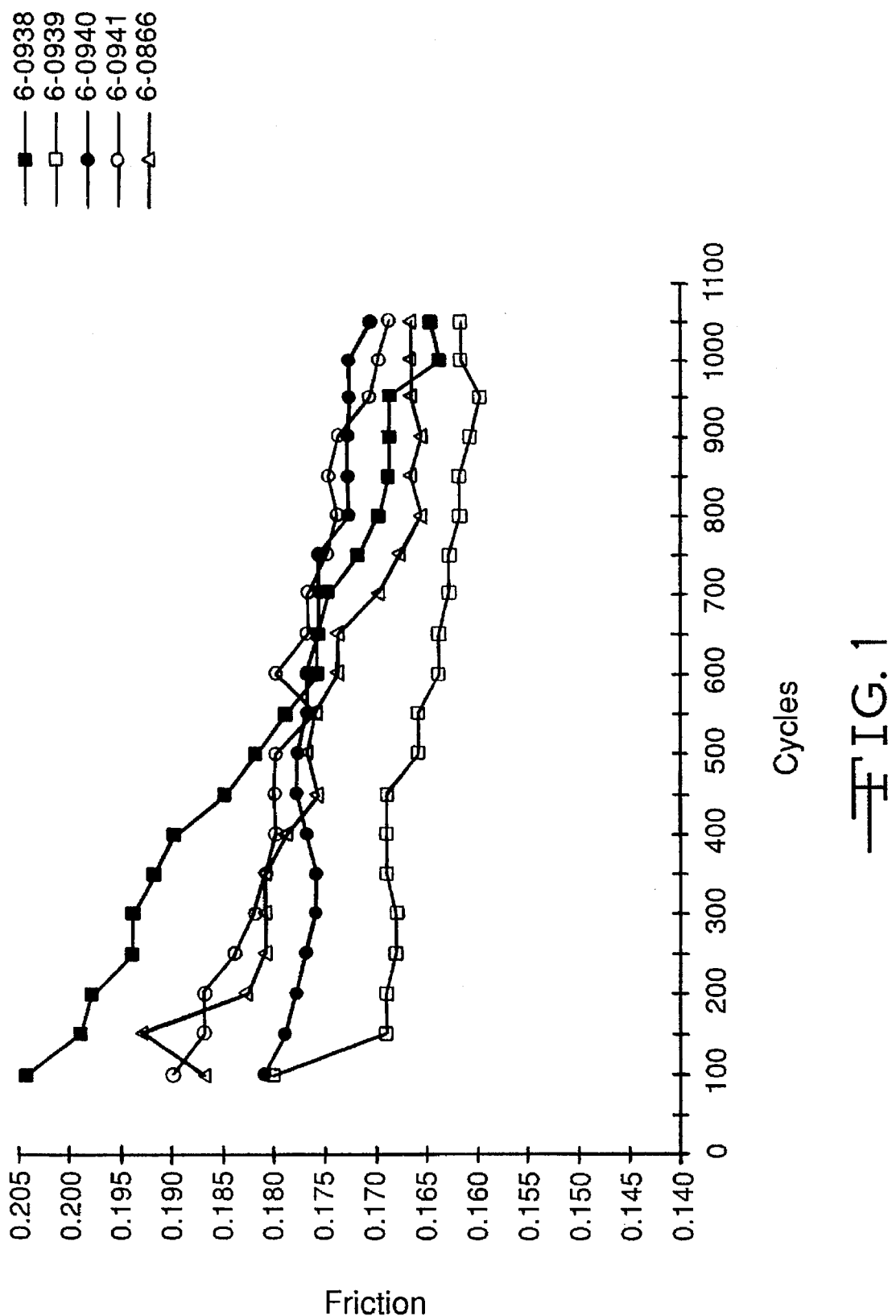
FIG. 1 is a graph comparing the coefficient of friction as the number of cycles increases for various lining materials shown in Table 2.

In one aspect of the present invention, instead of using a solvent-based phenolic resin as an impregnant, the present invention provides adding a solid powdered phenolic resin into an aqueous paper making slurry or formulation comprising fibrous materials. This addition of powdered phenolic resin surprisingly provides the advantages of having a phenolic resin in the friction material without the disadvantage of having to heat the friction material to remove the solvent from any impregnating resin. Further according to the present invention, it is found that when a powdered silicone resin is added along with the powdered phenolic resin to the paper formulation, a surprisingly good friction material results. The friction material has higher energy capacity and higher coefficient of friction than conventional friction materials. It is further surprisingly found that when silicon nitride powder is incorporated into the paper formulation along with the powdered silicone resin and the powdered phenolic resin, there is further improvement in the dynamic coefficient of friction characteristics of the resulting friction material. This is especially surprisingly since fibers of silicon nitride are not suitable for inclusion in friction materials due to their abrasiveness of the silicon nitride fibers to the steel separator plate surfaces.

Various types of fibrous base or raw pulp materials are useful with the present invention. Particularly useful fibrous base materials can be comprised of cotton fibers, glass fibers, carbon fibers and/or aramid floc or fibers, which are generally designated as aromatic polycarbonamide materials. It is to be understood that various paper formulations are useful in the present invention and that other materials can be present in the paper formulations.

Another ingredient contemplated as being useful is an elastomeric polymer particle comprising about 70–75% elastomeric material with the balance being processing aids such as the product 4198 from Palmer International, Worcester, Pa., which is useful to provide additional friction lining wear resistance. The rubber-type particles allow the friction material to conform more closely to the mating separator plates in a clutch for example, and therefore, provides an increase in "real" versus "apparent" area of contact between the separator plates.

According to the present invention, at least one phenolic resin is incorporated into an aqueous paper pulp or slurry. Various phenolic resins useful in the present invention include, for example, phenolic novolac resins which are water insoluble solid particulate phenol-formaldehyde resins.

Phenolic resins useful in the present invention include the following novolac resins from Ashland Chemical Inc., Columbus, Ohio: PB-200A, a ground novolac phenolic resin with about 3–4% free phenol; PB-200B, a ground novolac phenolic resin with a hexamethylenetetramine crosslinker and about 3–4% free phenol; PB-206, a high molecular weight powdered or ground thermoplastic novolac phenolic-formaldehyde condensate resin with about 1–2% free phenol (typically about 1% free phenol); and, PB-207, a high molecular weight, powdered or ground novolac phenolic-formaldehyde condensate resin with a hexamethylenetetramine crosslinker and about 1–2% free phenol (typically about 1% free phenol). It is to be understood that various other phenolic novolac resins can be used and are contemplated as being useful with the present invention.

It has been surprisingly found that the presence of a silicone resin in the paper formulation is influential in the friction material performance. According to the present invention, the presence of a silicone resin causes the resulting friction material to be flexible or elastic. When pressures are applied to the friction material of the present invention, there is a more even distribution of pressure which, in turn, reduces the likelihood of uneven wear. Useful silicone resins include, for example, the ER-84002 polydimethylsiloxane silicone resin, made by Wacker Silicones Corporation of Adrian, Mich., which is a one part solid resin which has a high reactivity and heat resistance, and has a melting range of about 50°–100° C., typically has a particle size of <100 microns, and is soluble in esters, alcohols and aromatic hydrocarbons. It is to be understood, however, that other silicone resins can be utilized with the present invention.

Both high static and high dynamic friction coefficients are required for new friction material applications. The friction and wear performance of the friction material can be further improved by the incorporation of silicon nitride particles into the raw paper slurry during the paper formation. In preferred embodiments, the silicon nitride particles have an average diameter size of about one micron. However, variations in size ranging from about 0.5 to about 1.5 microns can also be used. One type of suitable silicon nitride particles is available from UBE Industries Inc. as $Si_3N_{14}$ grade SN-E-03. The silicon nitride particles increase the dynamic coefficient of friction when used at levels of about 5%. The static coefficient of friction is increased when levels of about 15% silicon nitride particle are used in the paper formulation.

If the initial coefficient of friction is low, then a friction material does not achieve its desired constant coefficient of friction value until after many uses or cycles of the friction material. It is advantageous to minimize the number of cycles required before a material is broken-in. The present invention provides a friction material having a high initial coefficient of friction. Further, when the dynamic coefficient of friction is close to the static coefficient of friction, there is a smooth transfer from one gear to another in a clutch operation. The present invention achieves a surprisingly good static to dynamic (S/D) coefficient of friction ratio with the addition of silicon nitride particles in the friction paper.

It is further contemplated that other ingredients useful in both preparing resin blends and in various resins used for impregnating fibrous-based materials can be included in the friction material. One such ingredient is cashew nut shell liquid (CNSL) particles. In addition, various fillers are useful in the friction lining material of the present invention. In particular, silica fillers, such as diatomaceous earth (celite), are useful. However, it is contemplated that other types of ingredients and fillers are suitable for use in the present invention and that the choice of ingredient and filler materials used in the friction material depends on the particular requirements of the friction material.

For example, carbon fibers act as a reinforcement member for friction material matrix. These fibers increase wear resistance and lining compression resistance. When a friction material is exhibiting these two characteristics, there is an improvement in fluid capillary flow. The increase in compression resistance prevents or decreases the material's chance of collapsing such that the capillary flow is maintained and sometimes improved.

It is contemplated that, in certain preferred embodiments, the fibrous based material can be formed from an aqueous slurry comprising about: 3–70%, by weight, aramid pulp, floc or fibers; 5–70%, by weight, cotton fibers; 5–70%, by weight, filler material; 10–80%, by weight, silicone resin; 3–80%, by weight phenolic material; 3–25%, by weight, cashew nut shell liquid particles; and, about 3–25%, by weight silicon nitride powder, based on the weight of the aqueous slurry formulation for the fibrous based material.

In various more preferred embodiments the fibrous base material can be formed from an aqueous slurry comprising about 3–10%, by weight, aramid floc or fibers; 30–50%, by weight, cotton fibers; 10–30%, by weight, filler material; 25–55%, by weight, silicon resin; 5–15%, by weight, phenolic resins; 3–15%, by weight, cashew nut shell liquid particles; and, 2–7%, by weight, silicon nitride powder.

After the fibrous base material is formed into a friction material or paper, the friction material is heated. The heating cures the phenolic resin at a temperature of about 300° F. and cures the silicone resin at a temperature of about 400° F. Thereafter, the cured friction material is adhered to a desired substrate (such as a clutch plate or a brake shoe) by suitable means.

It is to be understood that the type of lubricant used in an wet clutch affects the characteristics of the friction material. Lubricants influence the performance of various characteristics of the resulting friction material including static friction, dynamic friction (and therefore the static/dynamic ratio) viscosity, viscosity index, oxidation stability, extreme pressure capacity, foam stability and the like. The interface between the friction material and the desired substrate and the mechanical and chemical factors affect the system performance. The friction material of the present invention are useful with various lubricants. The selection of the optimum ingredients and range of ingredients can be determined by evaluating the conditions under which the friction material will be exposed and the type of lubricant material used in such system.

The following examples provide further evidence that the friction material of the present invention is an improvement over the conventional friction linings. Various preferred embodiments of the invention are described in the following examples, which however, are not intended to limit the scope of the invention.

EXAMPLE 1

Powdered silicone and phenolic resins were evaluated in paper formulations at two basis weights. Two densities were evaluated at each basis weight.

Various hand sheet formulations included silicone resin or phenolic resin. In addition, one formulation included silicone resin and phenolic resin powder. The hand sheet formulations also included cashew nut shell liquid (CNSL) particle for increasing wear resistance.

The materials were used in assemblies which were subjected to a Full Pack friction and wear evaluation using moderate and high energy test procedures 528C and 527C, respectively. LVFA tests were performed. All tests were run with Exxon 1975 Type "H" lubrication.

The friction fibrous materials comprised cotton fibers, Kevlar® aramid fiber pulp, celite and, in certain cases, carbon fibers and/or CNSL particles in the amounts shown:

| | |
|---|---|
| HS-110-90 | cotton fibers/Kevlar ® fibers/celite/carbon fibers/ PB-200B phenolic powder (3.0%)/ER-84002 silicone resin powder (32%) Basic weight = 270 lb./Caliper = 0.038 inches |
| Example 1-1 | (Thin)/F.L.T. = 0.025 inches Final Assembly Thickness = 0.078–0.082 inches |
| Example 1-2 | (Thick)/F.L.T. = 0.035 inches Final Assembly Thickness = 0.098–0.102 inches |
| HS-111-90 | cotton fibers/Kevlar ® fibers/celite/carbon fibers/CNSL/ER-84002 silicone resin (35%) Basic weight = 270 lb./Caliper - 0.037 inches |
| Example 1-3 | (Thick) F.L.T. = 0.035 inches Final Assembly Thickness = 0.098–0.102 inches |
| Example 1-4 | (Thin) F.L.T. = 0.025 inches Final Assembly Thickness 0.078–0.082 inches |
| HS-112-90 | cotton fibers/Kevlar ® fibers/celite/PB-207 phenolic resin (35%) Basic weight = 200 lb./Caliper = 0.028 inches |
| Example 1-5 | F.L.T. = 0.025 inches Final Assembly Thickness = 0.074–0.082 inches |

-continued

| | |
|---|---|
| HS-113-90 | cotton fibers/Kevlar ® fibers/celite/PB-206 phenolic resin (35%) Basic weight = 200 lb./ Caliper = 0.028 inches |
| Example 1-6 | F.L.T. - 0.025 inches Final Assembly Thickness = 0.074–0.082 |
| HS-66-90 | cotton fibers/Kevlar ® fibers/celite/ER-84002 |
| Example 1-7 | silicone/carbon fibers Basic weight = 275 lb. |

Capillary flow analysis was performed on selected friction materials to measure mean pore size diameters of the materials. A compression-relaxation test was performed on selected materials to measure elastic character of a friction material formulation.

EXAMPLE 1A

The LVFA showed that there is reduced pack loss when phenolic powder is added to a paper formulation containing silicone powder and carbon fibers.

As seen in Table I below, the lining wear was reduced from 4.6 mils to 3.9 mils with the addition of phenolic PB-200B resin powder to the paper formulation containing silicone ER-84002 resin powder. When additional compression was applied to the lining material, wear was reduced even further, to 3.0 mils. The lining compression and permanent set data show the lining with only silicone resin powder to have more permanent set, compared to the lining containing a phenolic resin therein.

The addition of phenolic powder or the cashew nut shell liquid particle into the formulation both resulted in increases in friction coefficients. The compressed material containing phenolic PB-200B powder (Example 1—1) resulted in the highest static and dynamic friction coefficients of 0.127 and 0.181, respectively, as shown in Table I below. Reducing the lining thickness of the material with the cashew nut shell particle reduced friction coefficients and wear (Example 1-3 versus Example 1-4).

TABLE I

Low Velocity Friction Apparatus
Exxon 1975 Type "H" ATF - 12 psi - 300° F. Friction Data

| Lining Material | Static | Dynamic | Lining Wear (mils) |
|---|---|---|---|
| Silicone Powder - Thin (Example 1-1) with 3% PB-200B Powder Test 5204602 | 0.127 | 0.181 | 3.0 |
| Silicone Powder - Thick (Example 1-2) with 3% PB-200B Powder Test 5204601 | 0.118 | 0.168 | 3.9 |
| Silicone Powder - Thick (Example 1-3) with 3% CNSL Particle Test 5204603 | 0.124 | 0.173 | 3.3 |
| Silicone Powder - Thin (Example 1-4) with 3% CNSL Particle Test 5204604 | 0.110 | 0.163 | 2.5 |
| Silicone Powder - Thick (Example 1-7) Test 5204203 | 0.115 | 0.167 | 4.6 |
| Production - SD1777 Test 5204702 | 0.105 | 0.148 | 0.8 |

EXAMPLE 1B

Referring now to Table II below, a Full Pack Test (528C) —Moderate Energy tests were conducted using the hand sheet formulations described above.

The clutch pack loss was higher when 3% phenolic PB-200B powder was added to the formulation as compared to test 6-0866. Tests with and without the phenolic PB-200B powder ran to completion. However, Example 1-2 (test 6-0939) with the phenolic PB-200B powder addition resulted in 45.1 mils of wear at completion.

Increasing the material density from about 48 to 66 improved wear resistance. The thin or denser material formulation with the addition of CNSL particle performed better than the thick or less dense material.

When the CNSL particle was used, the "thick" or less dense material lost 17.5 mils (Example 1-3, test 6-0940), while the "thin" or denser version lost 14.8 mils (Example 1-4, test 6-0941). Increasing the amount of lining material compression (i.e., increased lining density) reduces the pack loss.

Final friction coefficients from tests with and without the addition of the CNSL particle were similar, as shown in Example 1-3 (test 6-0940) and Example 1-7 (test 6-0866), respectively. Both tests had a low surface glazing ranking of "1". However, the Example 1-3 (test 6-0940), with the addition of the CNSL particle, displayed a low 4% dynamic friction coefficient fade. The dynamic friction coefficients at cycles 200 and 1050 were 0.178 and 0.171, respectively. A small addition of the CNSL particle into the formulation is advantageous from friction stability and wear resistance perspectives. FIG. 1 illustrates the high speed dynamic friction versus number of cycle for the Examples 1—1, 1-2, 1-3, 1-4 and 1-7 described in Table II.

The addition of phenolic PB-200B powder into the thick formulation resulted in a dynamic friction coefficient fade decrease from 9% to 4%, as seen in Example 1-7 (test 6-0866) versus Example 1-2 (test 6-0939). Material with a small addition of phenolic PB-200B powder (Example 1-2) had dynamic friction coefficients of 0.169 and 0.162 at cycles 200 and 1050, respectively. However, the amount of surface glazing increased from a ranking of "1" to "4". Even though the dynamic friction displayed a low percentage of fade, there was increased glazing and lining wear.

TABLE II

Full Pack Tests - Laboratory Data - 1050th Cycle
Part No. 8655619 - Procedure 528C - Moderate Energy
Exxon 1975 Type "H" ATF - 200° F.

| Lining Material | Dyn. *Low Speed | Dyn. High Speed | Pack Loss (mils) |
|---|---|---|---|
| Silicone Powder - Thin (Example 1-1) with 3% PB-200B Powder Test 6-0938 | 0.143 | 0.165 | 20.0 |
| Silicone Powder - Thick (Example 1-2) with 3% PB-200B Powder Test 6-0939 | 0.134 | 0.162 | 45.1 |
| Silicone Powder - Thick (Example 1-3) with 3% CNSL Particle Test 6-0940 | 0.146 | 0.171 | 17.5 |
| Silicone Powder - Thin (Example 1-4) with 3% CNSL Particle Test 6-0941 | 0.144 | 0.169 | 14.8 |
| Phenolic Powder PB-207 (Example 1-5) Thermoset Test 6-0949 | 0.125 | 0.144 | 19.7 |
| Phenolic Powder PB-206 (Example 1-6) Thermoplastic Test 6-0952 | 0.140 @ 950 | 0.160 | 12.6 |
| Silicone Powder - Thick (Example 1-7) (0.101") Test 6-0866 | 0.134 @ 1000 | 0.167 | 26.8 |

TABLE II-continued

Full Pack Tests - Laboratory Data - 1050th Cycle
Part No. 8655619 - Procedure 528C - Moderate Energy
Exxon 1975 Type "H" ATF - 200° F.

| Lining Material | Dyn. *Low Speed | Dyn. High Speed | Pack Loss (mils) |
|---|---|---|---|
| Phenolic Powder PB-200B Test 6-0838 | 0.131 | 0.145 | 22.0 |
| SD1777 Production Test 6-0835 | 0.138 | 0.136 | 13.0 |
| SD1777 Production Test 6-0833 | 0.129 | 0.137 | 17.6 |

*Low speed dynamic using the 45 degree method.

EXAMPLE 1C

Referring now to Table III, Full Pack Test (527C)—High Energy tests were conducted using the hand sheet formulations described above.

The energy capacity of the friction material with the phenolic PB-200B powder increased when more compressed linings were tested. When lining density was increased from roughly 48 to 66, the material performed better. Specifically, the lining was phenolic PB-200B powder compressed to a 66 density (Example 1—1, test 6-0942) was able to successfully complete the test with only 8% dynamic friction fade. This material had a low glazing ranking of "1" Delamination and abrasion were ranked "0". The same material subjected to less compression completed only 700 cycles (Example 1-2).

Results from the higher energy test for Example 1-2 (test 6-0943) indicate no friction advantage when the phenolic PB-200B powder was included in the formulation, when compared to the silicone thick material (Example 1-7, test 6-0883). However, the phenolic PB-200B powder addition increased the lining set resistance. The addition of phenolic PB-200B powder may also increase the shear strength of the lining.

Figure 2:
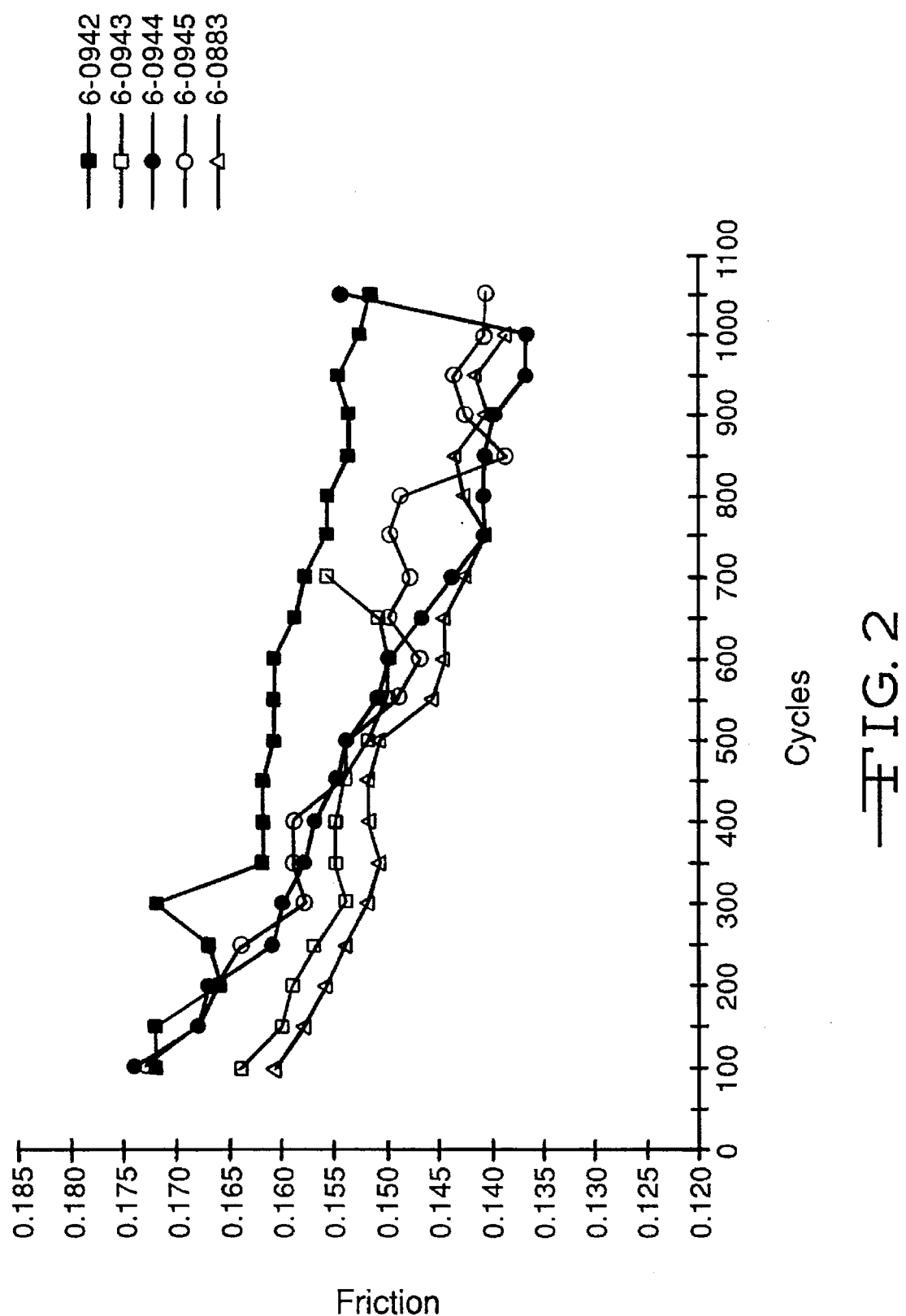
FIG. 2 is a graph comparing the coefficient of friction as the number of cycles increases for various formulations shown in Table 3.

The performance of material with CNSL particle addition was not as sensitive to compression. Table III below summarizes the full pack high energy test results. High speed dynamic friction coefficient versus cycle data are given in FIG. 2.

Figure 3:
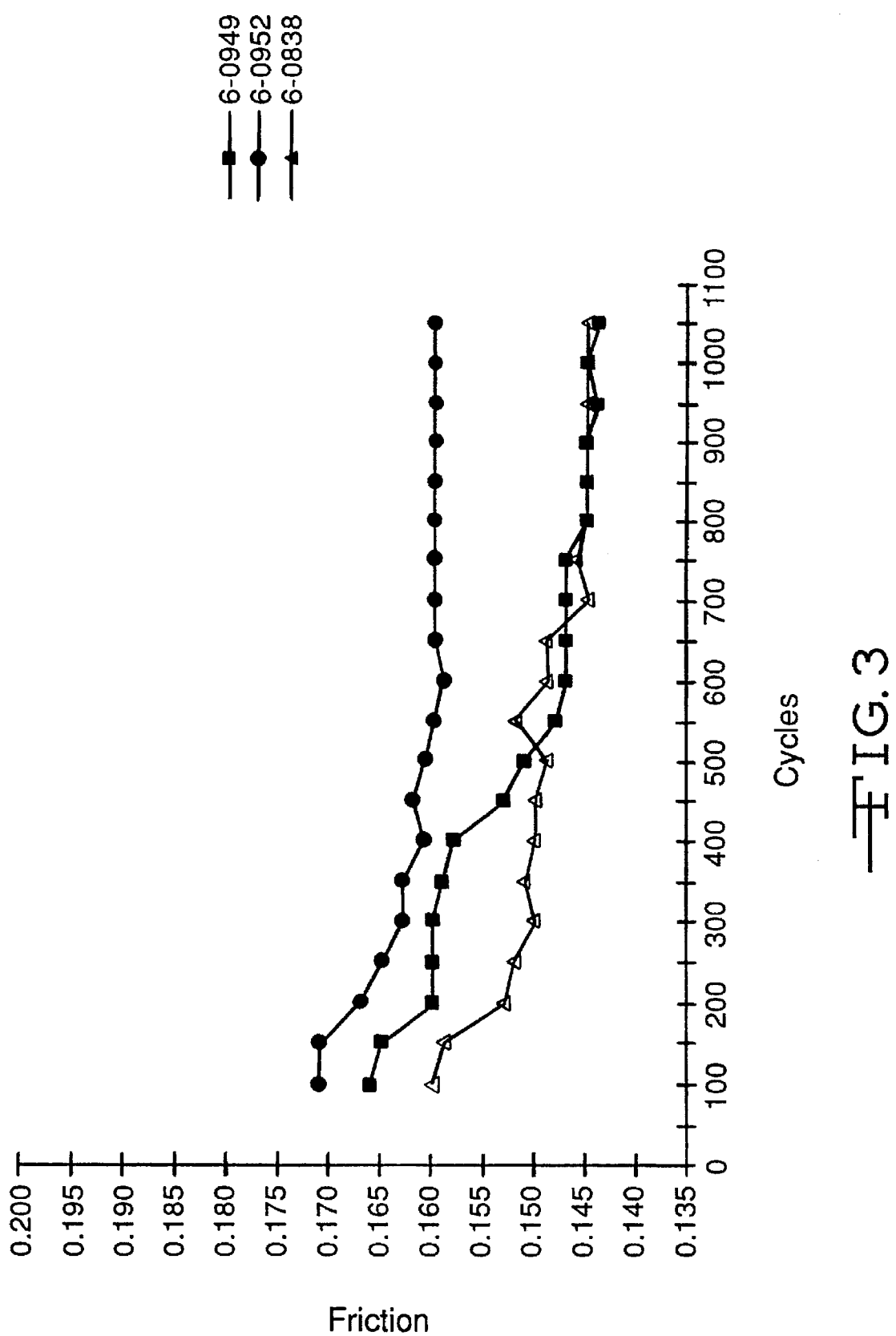
FIG. 3 is a graph comparing the coefficient of friction as the number of cycles increases for various formulations shown in Table 2.
Figure 4:
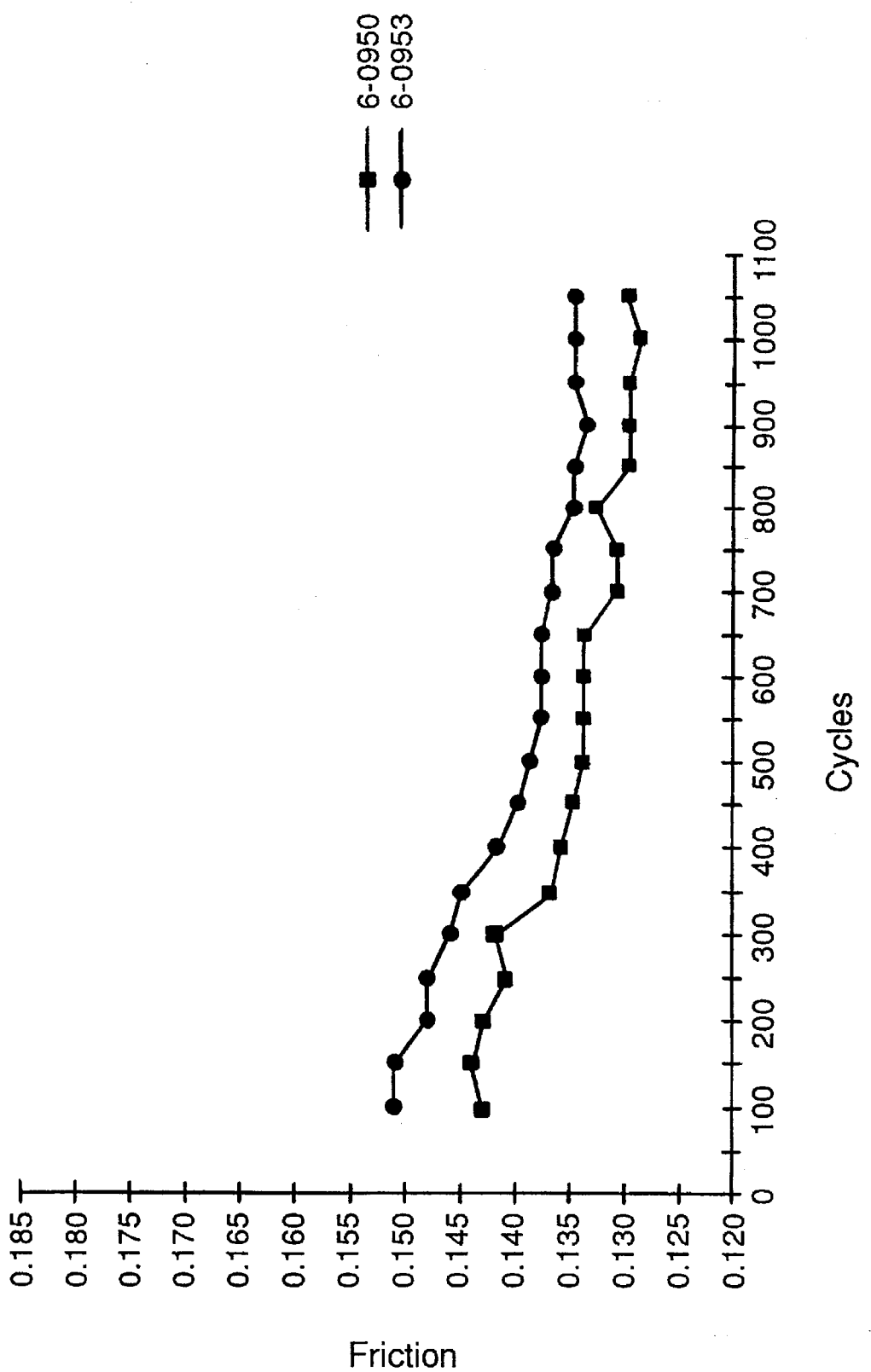
FIG. 4 is a graph comparing the coefficient of friction as the number of cycles increases for various formulations shown in Table 3.

The moderate and high energy test results from materials including either phenolic powder PB-206 or PB-207 (Examples 1-5 and 1-6) are given in Tables II and III above. The high speed dynamic friction versus number of cycle curves for tests using procedure 528C and 527C are given in FIGS. 3 and 4, respectively.

The phenolic powder PB-200B material (see test 6-0838 in Table II above) is useful as a baseline for comparing the phenolic powders PB-206 and PB-207.

Thermoplastic phenolic PB-206 powder exhibits desirable friction and wear performance. For example, Example 1-6, test 6-0952 (as shown in Table II) resulted in a high 0.160 final dynamic friction coefficient, excellent pack assembly appearance, and a low 12.6 mils of material loss. The PB-207 material performed similarly to phenolic PB-200B powder, see Example 1-5, test 6-0949 versus test 6-0838 in Table II above.

TABLE III

Full Pack Tests - Laboratory Data - 1050th Cycle
Part No. 8655619 - Procedure 527C - High Energy
Exxon 1975 Type "H" ATF - 200° F.

| Experimental Lining Material | Dyn. *Low Speed | Dyn. High Speed | Pack Loss (mils) |
|---|---|---|---|
| Silicone Powder - Thin (Example 1-1) with 3% PB-200B Powder Test 6-0942 | 0.137 | 0.152 | 24.5 |
| Silicone Powder - Thick (Example 1-2) with 3% PB-200B Powder Test 6-0943 | 0.136 @ 650 | 0.156 @ 700 | NA |
| Silicone Powder - Thick (Example 1-3) with 3% CNSL Particle Test 6-0944 | 0.144 | 0.137 @ 1000 | NA |
| Silicone Powder - Thin (Example 1-4) with 3% CNSL Particle Test 6-0945 | 0.133 | 0.141 | NA |
| Phenolic Powder PB-207 (Example 1-5) Thermoset Test 6-0950 | 0.113 | 0.130 | 41.8 |
| Phenolic Powder PB-206 (Example 1-6) Thermoplastic Test 6-0953 | 0.126 | 0.135 | 27.0 |
| Silicone Powder - Thick (Example 1-7) (with carbon fiber) Test 6-0883 | 0.122 | 0.139 @ 1000 | wipeout @ 1047 |
| SD1777 Production Test 6-0836 | 0.136 | 0.123 | 22.7 |
| SD1777 Production Test 6-0834 | 0.137 @ 800 | 0.131 @ 800 | 74.7 @ 810 |

*Low speed dynamic using the 45 degree method.

EXAMPLE 1D

Referring now to Table IV below, Capillary Flow Analysis tests were conducted.

Increasing the material basis weight (BW) from 200# to 275# reduces the pore size in the friction material from about 5.5 micron to 5.0 micron mean pore size diameter. In certain embodiments, addition of carbon fibers into the formulation can be useful to further open the lining matrix and increase pore size diameter.

TABLE IV

Capillary Flow Analysis
Five Measurements per Friction Material
(Cured Paper - Non-Compressed)

| Friction Material | Mean Pore Size -microns- | Standard Deviation |
|---|---|---|
| Silicone Powder cotton/Kevlar ® fibers/celite 200# Basis Weight HS4090 | 5.5848 | 0.7865 |
| Silicone Powder cotton/Kevlar ® fibers/celite 275# Basis Weight HS6590 | 4.9849 | 0.4108 |
| Silicone Powder with carbon fibers cotton/Kevlar ® fibers/celite 275# Basis Weight HS6690 | 5.4640 | 0.4133 |
| Phenolic Powder cotton/Kevlar ® fibers/celite 200# Basis Weight HS3990 | 5.5216 | 0.6612 |
| Phenolic Powder cotton/Kevlar ® fibers/celite | 5.0591 | 0.1554 |

TABLE IV-continued

Capillary Flow Analysis
Five Measurements per Friction Material
(Cured Paper - Non-Compressed)

| Friction Material | Mean Pore Size -microns- | Standard Deviation |
|---|---|---|
| 275# Basis Weight HS6390 Phenolic Powder with carbon fibers cotton/Kevlar ® fibers/celite 275# Basis Weight HS6490 | 6.0824 | 0.5884 |

EXAMPLE 1E

Compression—Relaxation Tests were conducted using the following friction material formulations which comprising:

| | |
|---|---|
| HS-66-90 | cotton fibers/Kevlar ® fibers/celite/ER-84002 silicone resin/carbon fibers Basic weight = 275 lb. |
| HS-169-90 | cotton fibers/Kevlar ® fibers/celite/carbon fibers/ PB200B phenolic resin (3%)/silicone resin ER-84002 (32%) |
| 652C | cotton fibers/Kevlar ® fibers/celite saturated with Arophene ® 295 phenolic resin (38%) |
| HS-39-90 | cotton fibers/Kevlar ® fibers/celite/PB200B phenolic resin |
| HS-40-90 | cotton fibers/Kevlar ® fibers/celite/ER-84002 silicone resin |

Compressibility is a measure of a material's ability to return to its original size after being compressed. As seen in FIGS. 5a, 5b, 6a and 6b, a non-saturated silicone powder friction material has less permanent set when a small amount of phenolic powder is added to the formulation. Both materials have a small amount of carbon fibers included in the formulation. The addition of phenolic PB-200B powder in the friction material formulation lowered the permanent set value approximately 18% from 0.128 in./in. (FIG. 6a) to 0.105 in./in. (FIG. 6b). These values are substantially lower than the 0.285 in./in. permanent set value exhibited from a material without carbon fibers and without phenolic PB-200B powder additions (data not shown in Figures).

Referring now to FIGS. 7a and 7b, compressed and non-compressed materials (652C) saturated with a 38% resin pickup phenolic Arophene® 295 resin were evaluated for comparison. The 200 lb. basis weight material has a permanent set value of 0.115 in./in. when non-compressed (FIG. 7a); the permanent set value drops to 0.016 in./in. once compressed (FIG. 7b). The conventionally saturated material has a 0.245 in./in. value (FIG. 7a) when non-compressed versus a 0.076 in./in. value (FIG. 7b) when compressed.

Figure 8A:
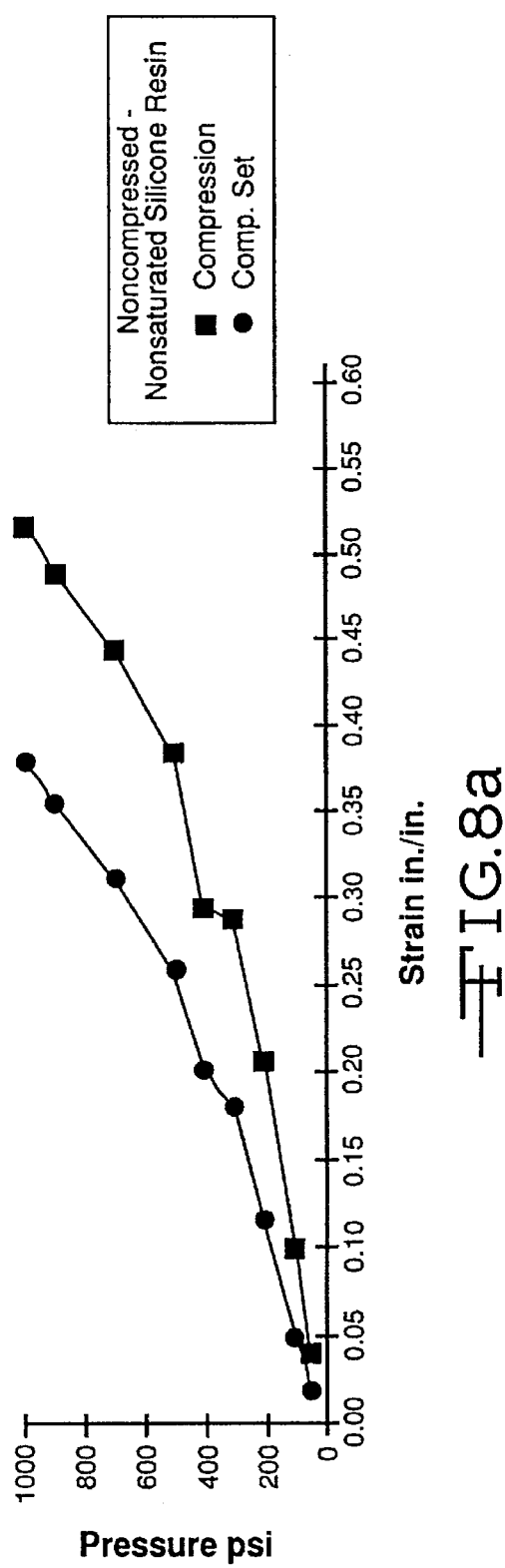
FIG. 8a is a graph comparing the compression and permanent set for a non-compressed friction material comprising a silicone resin.
Figure 8B:
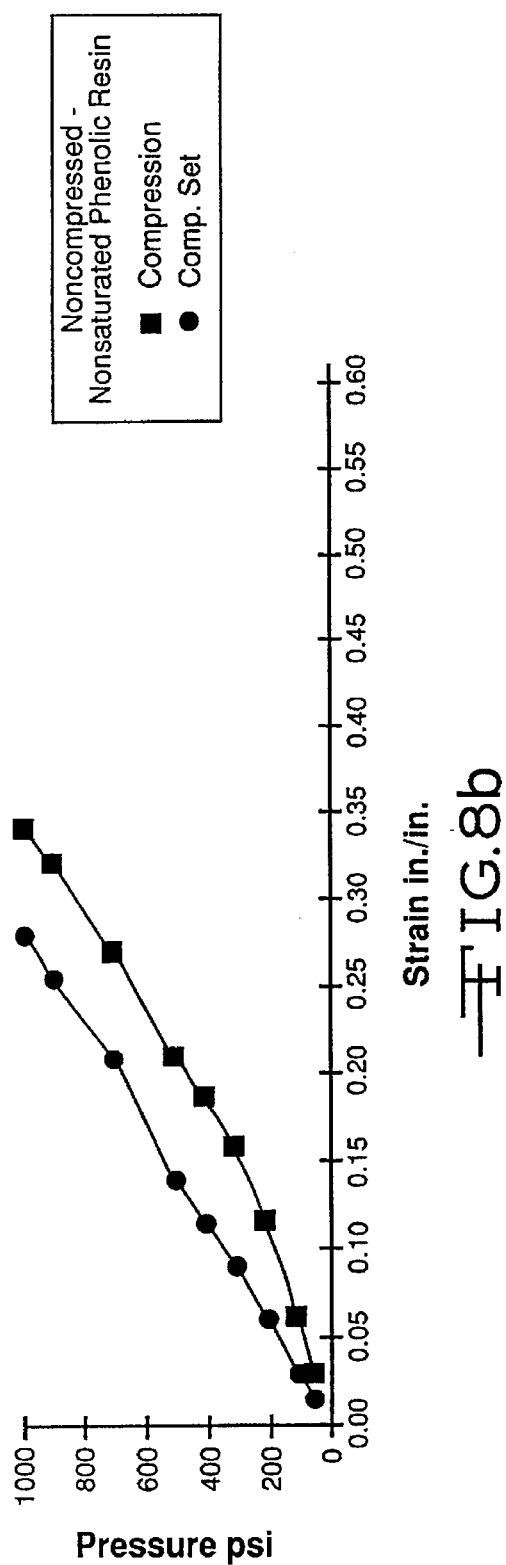
FIG. 8b is a graph comparing the compression and permanent set for a non-compressed friction material comprising a phenolic resin.

Referring now to FIGS. 8a, 8b, 9a and 9b, the HS-39-90 and HS-40-90 materials contain phenolic PB-200B powder and silicone ER-84002 powder, respectively. The material with phenolic PB-200B powder had a permanent set of 0.277 in./in. when non-compressed (FIG. 8b), while the material with silicone ER-84002 powder had a permanent set of 0.380 in./in. (FIG. 8a). The material with silicone ER-84002 powder is more susceptible to permanent set.

Figure 9A:
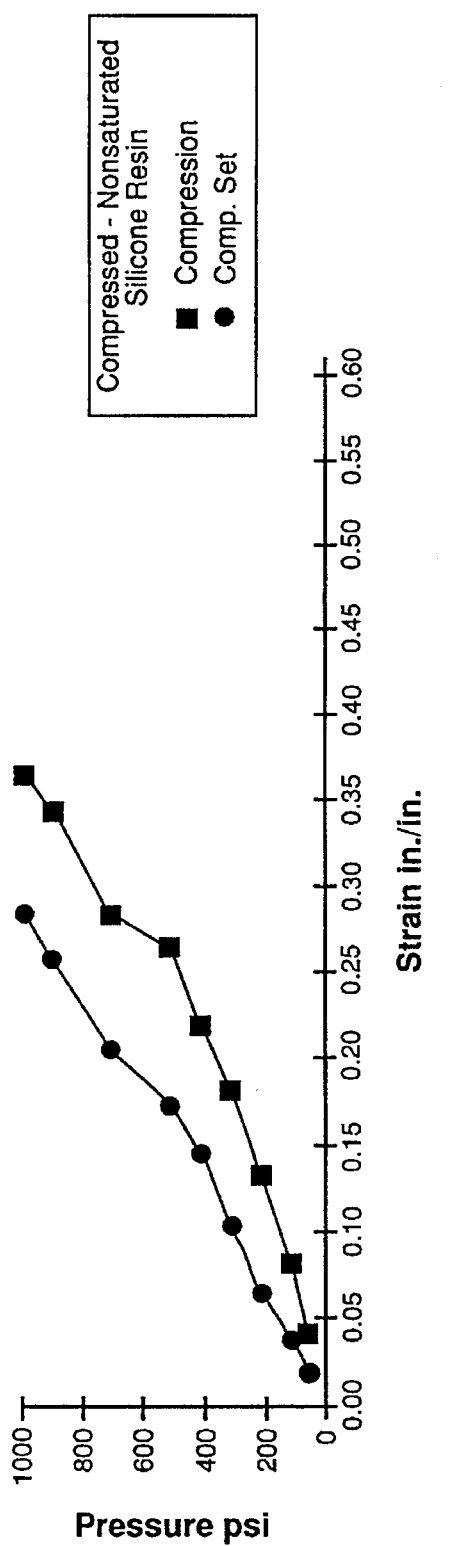
FIG. 9a is a graph comparing the compression and permanent set for a compressed friction material comprising a silicone resin.
Figure 9B:
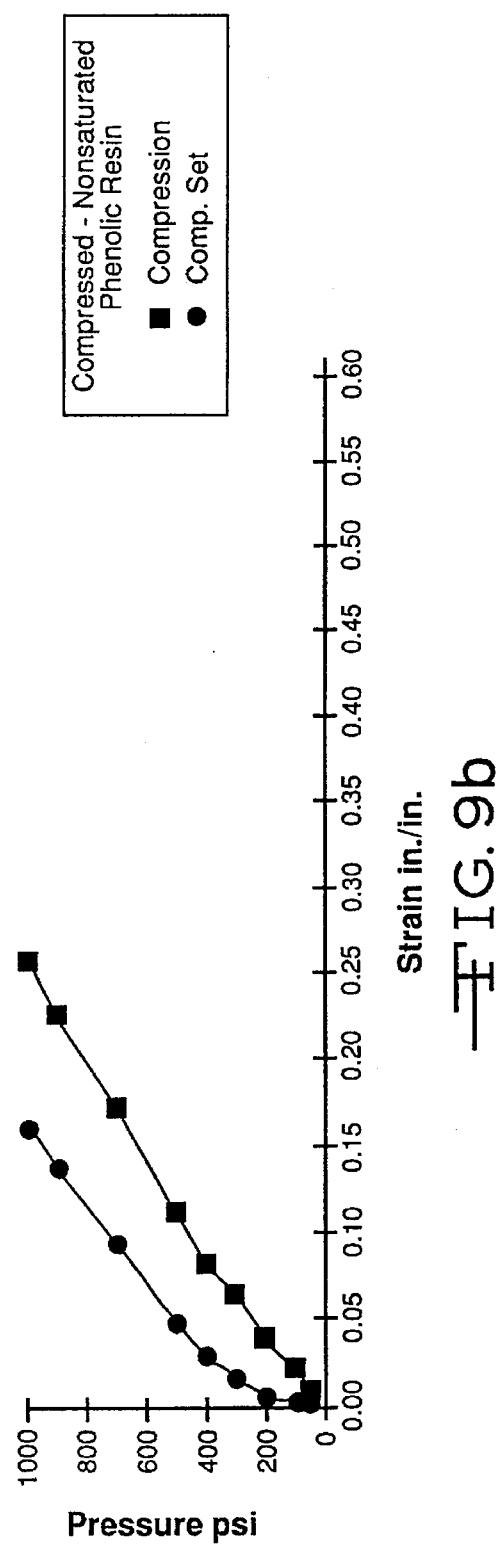
FIG. 9b is a graph comparing the compression and permanent set for a non-compressed friction material comprising a silicone resin.

After compression, the material with phenolic PB-200B powder had a permanent set value of 0.160 in./in. (FIG. 9b), while the silicone ER-84002 powder material had a 0.285 in./in. set (FIG. 9a). The material with silicone ER-84002 powder is more susceptible to permanent set.

The non-saturated materials of the present invention exhibit more permanent set than those conventionally saturated materials. Therefore, tests with non-saturated material that show "high pack loss" may actually be compressing and permanently setting.

Non-saturated materials are substantially more compressible than conventionally liquid saturated material. The compressibility of the material with phenolic PB-200B powder was 0.339 in./in. (FIG. 5b) when non-compressed, and 0.258 in./in. (FIG. 5a) when compressed. Even more compressible was the material with silicone ER-84002 powder which was compressed to 0.518 in./in. when non-compressed, and 0.364 in./in. when compressed.

Wear is reduced when a silicone powder friction material with a higher density is used. The addition of small amounts of phenolic powder to a silicone powder-containing friction material reduces compressibility. The higher density silicone friction material, with a small amount phenolic powder added, can withstand higher energy testing.

EXAMPLE 2

Friction material formulations were made and cured at 400° F. for 2 hours. The cured material was bonded to core plates for friction and wear evaluation. Tests were run following procedures, moderate energy and high energy 528C and 527C, respectively.

The friction materials comprised cotton fibers, Kevlar® fibers, celite, carbon fibers and PB200B phenolic resin and ER-84002 silicone resin, and, in certain formulations, silicon nitride and/or cashew nut shell liquid particles (CNSL), in the following formulations:

| | |
|---|---|
| HS-169-90 | cotton fibers/Kevlar ® fibers/celite/carbon fibers/ phenolic resin (3%)/silicone resin (32%) |
| Example 2-1 | 274 lb. basis weight/F.L.T. = 0.025 in./Wire up |
| Example 2-2 | 274 lb. basis weight/F.L.T. = 0.020 in./Wire up |
| HS-168-90 | cotton fibers/Kevlar ® fibers/celite/carbon fibers/ phenolic resin (5%)/silicone resin (30%) |
| Example 2-3 | 274 lb. basis weight/F.L.T. = 0.025 in./Wire up |
| Example 2-4 | 274 lb. basis weight/F.L.T. = 0.020 in./Wire up |
| HS-167-90 | cotton fibers/Kevlar ® fibers/celite/carbon fibers/ phenolic resin (5%) silicone resin (30%)/silicon nitride particles (2%) |
| Example 2-5 | 270 lb. basis weight/F.L.T. = 0.025 in./Wire up |
| Example 2-6 | 270 lb. basis weight/F.L.T. = 0.020 in./Wire up |
| RHS-20-91 | cotton fibers/Kevlar ® fibers/celite/carbon fibers/ phenolic resin (5%)/silicone resin (32%)/silicon nitride (2%)/CNSL (3%) |
| Example 2-7 | 275 lb. basis weight/F.L.T. = 0.025 in./Wire Up |
| Example 2-8 | 275 lb. basis weight/F.L.T. - 0.020 in./Wire Up |
| HS-116-90 | cotton fibers/Kevlar ® fibers and floc/celite/ carbon fibers and particles/saturated with phenolic resin |

EXAMPLE 2A

The results of a full pack test (moderate energy test 528C) which measured the friction coefficient and percent fade of the above friction materials are shown in Table V below. The non-saturated silicone materials have an average final dynamic friction coefficients greater than 0.160, which is approximately 17% higher the resulting coefficient from tests with the production material.

The silicone-based paper formulation material with the addition of 3% phenolic resin had a final dynamic friction of 0.165, (see Example 1—1). This formulation had a 16.7% fade. When more phenolic powder (5%) is added, the final dynamic friction increases to 0.173, and fade is lowered to 8.5% (see Example 2-3). The addition of 5% phenolic resin to the friction material formulation improves the friction coefficient, reduced the pack loss, and reduced the percent dynamic friction fade.

Figure 10:
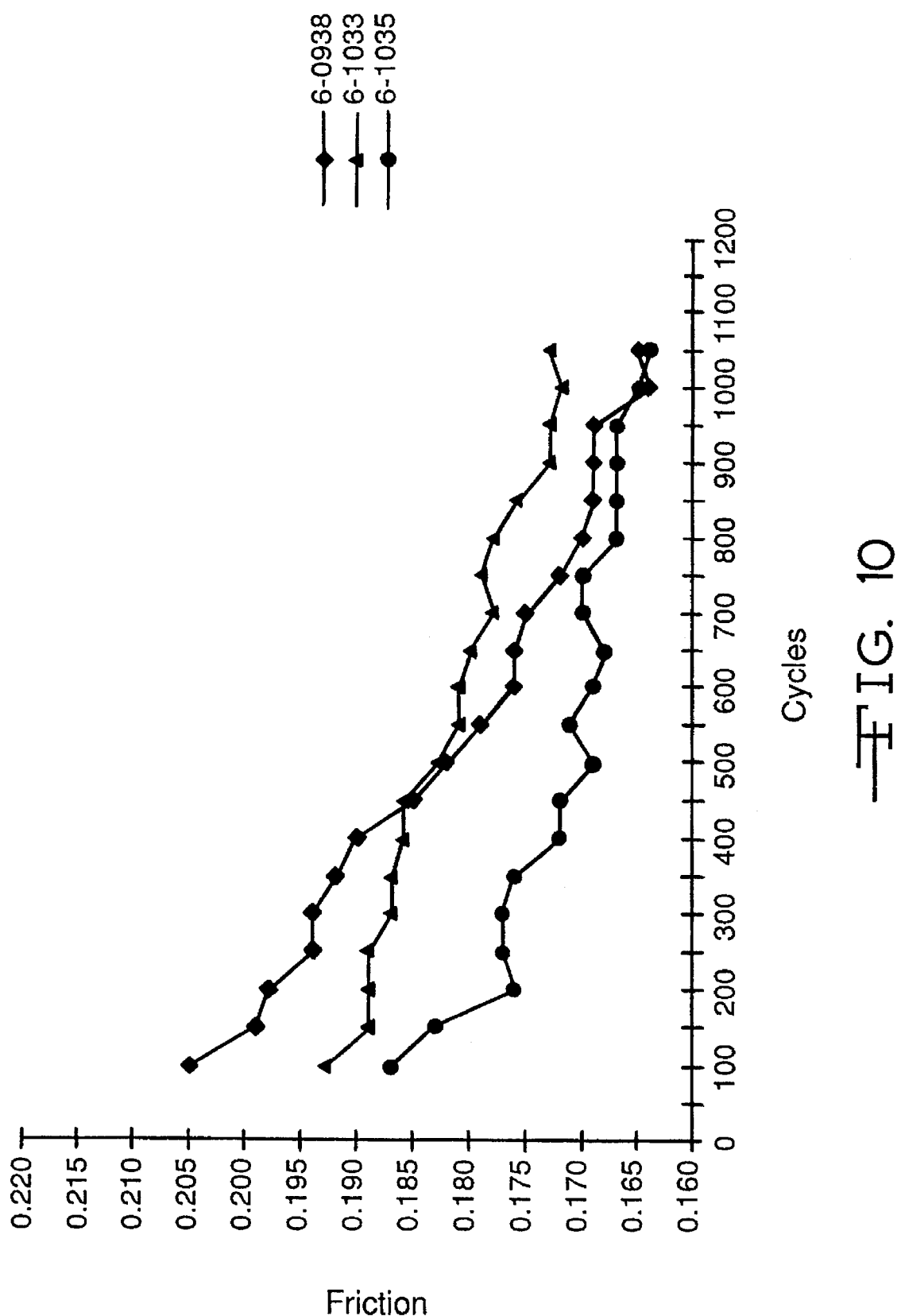
FIG. 10 is a graph comparing the coefficient of friction as the number of cycles increases for various formulations shown in Table 2.

A comparison of the friction versus cycles for the tested materials Example 1—1, Example 2-3, and Example 2-5 are illustrated in FIG. 10.

In the moderate energy (528C—1.2 horsepower) test, the addition of small amounts of phenolic powder to a silicone resin system is advantageous. However, when the higher energy (527D—1.6 horsepower) tests are performed, additional lining glaze was found to accompany the increased amount of phenolic powder (as shown in detail below in Example 2B and Table VII).

The addition of 2% silicon nitride particle to the silicone-phenolic formulation helps to reduce the percent friction fade from 8.5% to 6.8%. The addition of the silicon nitride particle helps reduce the formation of transfer films on the surface of the assembly part. Reducing the amount of a transfer film formed on an assembly surface helps reduce the percent of friction fade. This reduction is significant since glaze and friction fade can be two of the most difficult parameters to control.

Pack loss and wear was also measured. The moderate energy 528C test results indicate increasing the phenolic powder content from 3% to 5% by weight resulted in increased wear resistance. Pack loss was reduced from 20.1 mils to 12.4 mils, see Example 1—1 and Example 2-3, respectively.

The addition of cashew-nut shell liquid (CNSL) particle helps reduce pack loss. When the CNSL particle is added the formulation, which already contains 3% phenolic particles and 2% particle silicon nitride, the wear was further reduced. Pack loss was reduced from 15.9 mils to 9.0 mils, see Example 2-5 and Example 2-7 respectively.

TABLE V

Full Pack Laboratory Data
Test Procedure 528C - Exxon 1975 Type "H" ATF
1050 Cycle Data

| Material Identification | Slow* Speed Dynamic | High Speed Dynamic | Pack Loss -mils- | Percent Fade |
|---|---|---|---|---|
| HS169-90 with 3% phenolic (Example 2-2) F.L.T. = 0.020 in. Test 6-1032 | 0.144 | 0.160 | 4.9 | 15.8% |
| HS-110-90 with 3% phenolic (Example 1-1) F.L.T. = 0.025 in. Test 6-0938 | 0.143 | 0.165 | 20.1 | 16.7% |
| HS-168-90 with 5% phenolic (Example 2-3) F.L.T. = 0.025 in. Test 6-1033 | 0.155 | 0.173 | 12.4 | 8.5% |
| HS-167-90 with 5% phenolic, 2% Si$_3$N$_4$ (Example 2-5) F.L.T. = 0.025 in. Test 6-1035 | 0.143 | 0.164 | 15.9 | 6.8% |
| RHS-20-91 with 3% phenolic, 2% Si$_3$N$_4$, and 3% CNSL Test 6-0988 (Example 2-8) F.L.T. = 0.020 in. | 0.138 | 0.149 | 3.3 | 11.3% |
| RHS-20-91 with 3% phenolic, 2% Si$_3$N$_4$ and 3% CNSL Test 6-0985 (Example 2-7a) F.L.T. = 0.025 in. | 0.148 | 0.168 | 9.0 | 10.2% |
| RHS-20-91 with 3% | 0.144 | 0.132 | 14.8 | 18.5% |

TABLE V-continued

Full Pack Laboratory Data
Test Procedure 528C - Exxon 1975 Type "H" ATF
1050 Cycle Data

| Material Identification | Slow* Speed Dynamic | High Speed Dynamic | Pack Loss -mils- | Percent Fade |
|---|---|---|---|---|
| phenolic, 2% Si$_3$N$_4$ and 3% CNSL Test 6-1002 (Example 2-7b) F.L.T. = 0.025 in. Texaco 13358A-ATF Production Material Test (6-0835) | 0.138 | 0.136 | 13.0 | 8.7% |
| Production Material Test (6-0833) | 0.129 | 0.137 | 17.6 | 8.1% |

*Low speed dynamic using the 45 degree method.

In Example 1 above, the tested assembly thicknesses were 0.100" and 0.080", which correspond to a 48.4 density (0.035" FLT), and a 67.8 density (0.025" Final Lining Thickness F.L.T.). In Example 2, the assembly thickness was reduced to 0.070" (F.L.T.=0.020") which corresponds to a density of 84.7. The steel core of the assembly is 0.030" thick. The density is calculated using 275 lb. basis weight paper and 54% resin pickup according to the formula below. High density linings were tested for increased wear resistance.

$$D=BW*1/FLT*(1+PU)*0.004$$

where

D=Density of the Lining

BW=Basis Weight of raw material in lb./3000 sq. ft

FLT=Final Lining Thickness in inches (after being cured and compressed)

PU=Resin Pickup

Assemblies with additional lining compression consistently resulted in lower pack loss. The material with 3% phenolic powder had a pack loss reduced from 20.1 mils to 4.9 mils by increasing lining density, see Examples 1—1 and 2—2, respectively. However, the Example 2—2 material had 15.8% friction fade and a glaze ranking of "1". A high percent fade and low glazing contradicts the conventional thinking behind the glaze/fade phenomena.

When the friction material which contains silicon nitride particles and CNSL particles is compressed, the pack loss is further reduced. Additional compression increased the lining density to 84.7, and reduced pack loss from 9.0 mils to 3.3 mils, see Examples 2-7 and 2-8, respectively. The use of CNSL particles and/or silicon nitride particles and/or lining compression are effective in reducing wear of the friction material.

Figure 11:
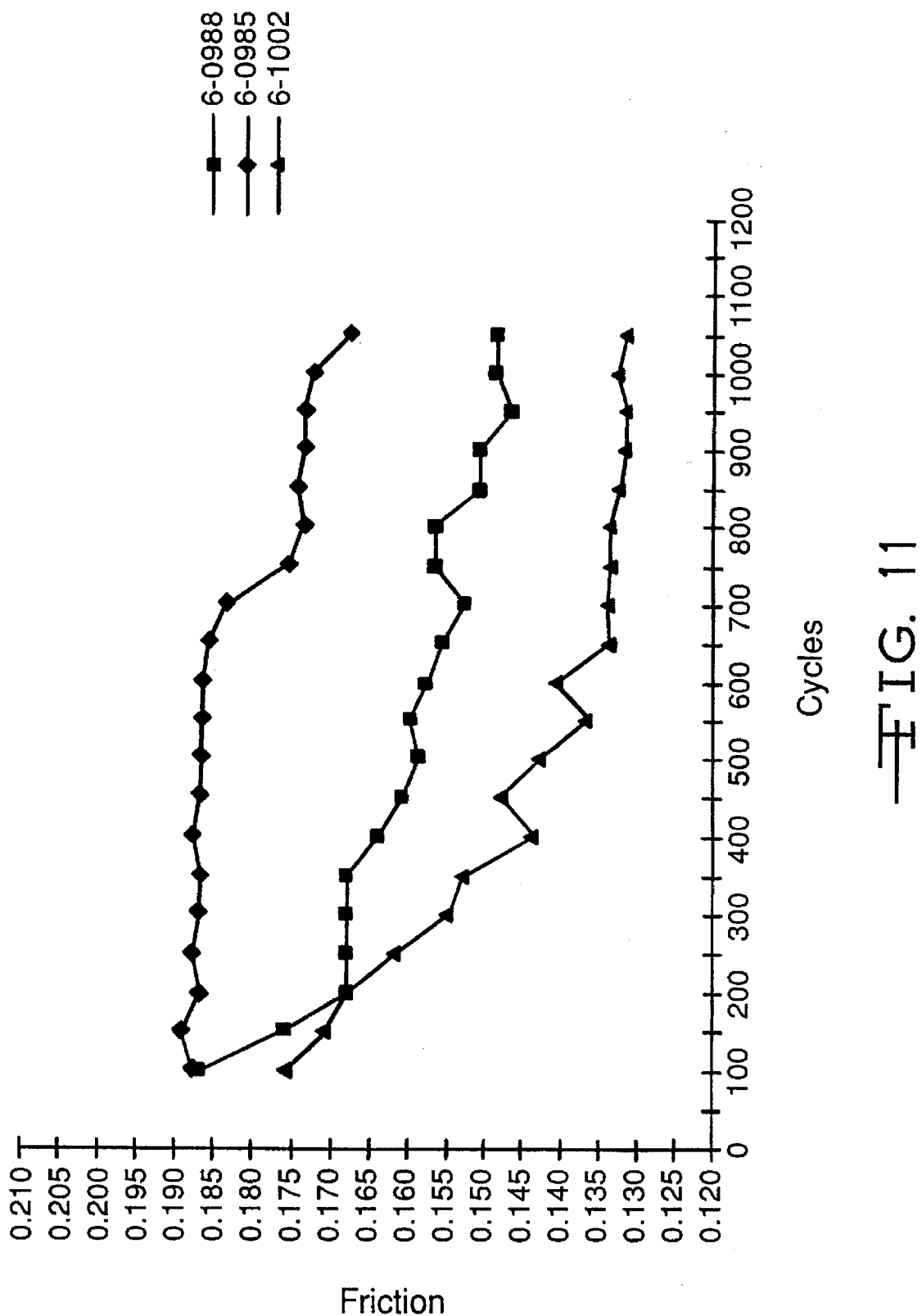
FIG. 11 is a graph comparing the coefficient of friction as the number of cycles increases for various formulations shown in Table 5.

As seen with Examples 2-7 and 2-8, compressing the assembly material to a final lining thickness of 0.020" reduces pack loss. However, increasing the assembly density results in the dynamic friction magnitude dropping to 0.149, from 0,168, and the glaze ranking increasing from "1" to "3". The friction versus cycle for Examples 2-8, 2-7a and 2-7b (tests 6-0988, 6-0985 and 6-1002) material at 0.025" and 0.020" final lining thicknesses are illustrated in FIG. 11.

EXAMPLE 2B

A full pack test (High Energy Test 527D) measuring the friction coefficient and percent fade was conducted. It is to be noted that the present production assemblies fail this relatively high 1.6 Hp test. All the materials of the present invention completed the test as shown in Table VI below. The test with a comparative HS-116-90 material which comprised a conventional friction material saturated with Arophene® 295 phenolic resin on assemblies had a final dynamic friction coefficient of 0.129, and 8.5% friction fade. Steel-lining interface temperatures of 977° F. are produced during a test run following the 527D procedure.

Assemblies with the silicone resin formulation and the addition of 3% PB200B phenolic powder have a final dynamic friction coefficient of 0.152, and 8.4% friction fade. See test 6-0942 where HS-169-90 has a final lining thickness is 0.025".

Using 2% silicon nitride particle reduces the percent friction fade to an 8.5% level. The friction material which also has 5% phenolic powder, resulted in a 0.151 final dynamic friction coefficient. (See test 6-1041, Example 2-5).

A silicone resin formulation with the addition of 3% phenolic powder, 2% silicon nitride particle, and 3% CNSL particle has a low final dynamic friction coefficient. This material results in a 0.125 dynamic friction coefficient and high percent friction fade (see test 6-0989, Example 2-8). The performance of this lining material improves once it is compressed to 0.025" (see test 6-0989 which had only 6.8 mils. of pack loss. These RHS-20-91 materials have a percent friction fade which is lower when the lining is compressed; exhibit increased wear resistance, but have lower dynamic friction coefficients, when compressed to a 84.7 density.

Figure 12:
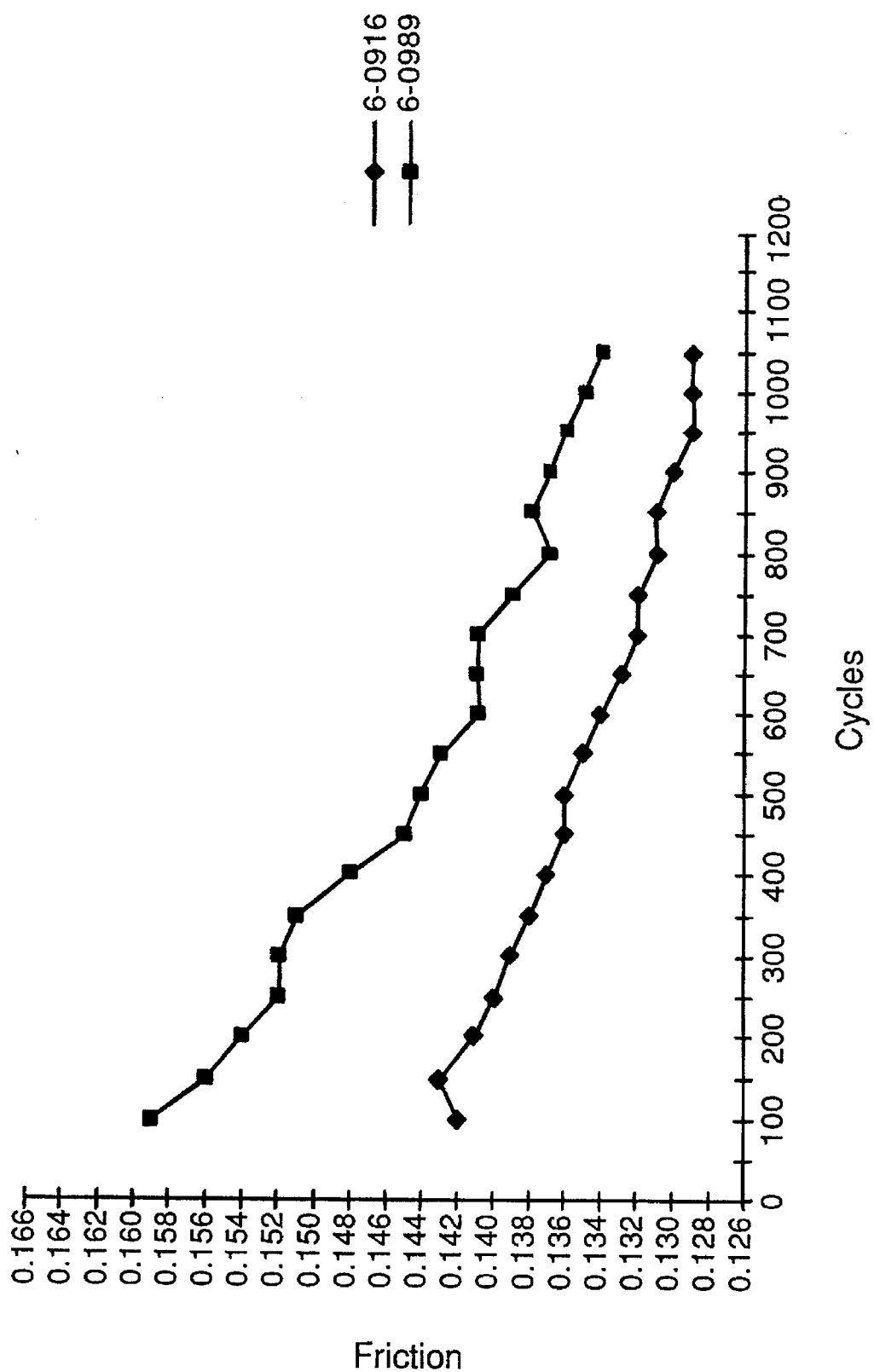
FIG. 12 is a graph comparing the coefficient of friction as the number of cycles increases for various formulations shown in Table 7.

The results indicate lower wear, and higher dynamic friction coefficient with the RHS-20-91 material as compared to HS-116-90 impregnated phenolic 295 resin material. However, the HS-116-90 material has a slightly lower percent friction fade, compared to the experimental material. A comparison of friction versus cycle for RHS-20-91 test 6-0989 and HS-116-90 is given in FIG. 12.

When the HS-169-90 material, which has 3% phenolic powder, is compressed to a 0.020" lining thickness, the final dynamic friction coefficient drops from 0.152 to 0.130. The friction fade increases from 8.4% to 19.8% (see test 6-0990).

TABLE VI

Full Pack Laboratory Data
Test Procedure 527C - Exxon 1975 Type "H" ATF
1050 Cycle Data

| Material Identification | Slow* Speed Dynamic | High Speed Dynamic | Pack Loss -mils- | Percent Fade |
|---|---|---|---|---|
| HS-169-90 with 3% phenolic (Example 2-2) F.L.T. = 0.020 in. Test 6-0990 | 0.122 | 0.130 | 13.5 | 19.8% |
| HS-169-90 with 3% phenolic (Example 2-1) F.L.T. = 0.025 in. Test 6-0995 | 0.129 | 0.132 | 20.6 | 15.9% |
| HS-110-90 with 3% phenolic (Example 1-1) F.L.T. = 0.025 in. Test 6-0942 | 0.137 | 0.152 | 24.5 | 8.4% |
| HS-168-90 with 5% phenolic (Example 2-4) F.L.T. = 0.020 in. Test 6-1036 | 0.126 | 0.122 | 13.1 | 17.6% |
| HS-168-90 with 5% phenolic (Example 2-3) F.L.T. = 0.025 in. | 0.136 | 0.148 | 25.1 | 11.9% |

TABLE VI-continued

Full Pack Laboratory Data
Test Procedure 527C - Exxon 1975 Type "H" ATF
1050 Cycle Data

| Material Identification | Slow* Speed Dynamic | High Speed Dynamic | Pack Loss -mils- | Percent Fade |
|---|---|---|---|---|
| Test 6-1037 HS-167-90 with 5% phenolic, 2% Si$_3$N$_4$ (Example 2-6) F.L.T. = 0.020 in. Test 6-1040 | 0.130 | 0.134 | 14.7 | 14.1% |
| HS-167-90 with 5% phenolic, 2% Si$_3$N$_4$ (Example 2-5) F.L.T. = 0.025 in. Test 6-1041 | 0.143 | 0.151 | 27.8 | 8.5% |
| RHS-20-91 with 3% phenolic, 2% Si$_3$N$_4$, and 3% CNSL (Example 2-8) F.L.T. = 0.025 in. Test 6-0989 | 0.132 | 0.134 | 6.8 | 12.9% |
| RHS-20-91 with 3% phenolic, 2% Si$_3$N$_4$, and 3% CNSL (Example 2-7) F.L.T. = 0.025 in. Test 6-0989 | 0.127 | 0.125 | 21.0 | 21.9% |
| Production Test 6-0836 | 0.136 | 0.123 | 22.7 | 14% |
| Production Test 6-0834 | 0.137 @ 800th cycle | 0.131 @ 800th cycle | 74.7 @ 810th cycle | NA |
| HS-116-90 (H3796) Phenolic 295 Resin (200#BW) Test 6-0916 | 0.125 | 0.129 | 14.0 | 8.5% |

*Low speed dynamic using the 45 degree method.

In Example 1 above, the 527C tests which include CNSL particle exhibit more assembly surface glazing; however, the addition of the CNSL particle helps increase assembly wear resistance. However, test 6-0942 with 3% resin (F.L.T.= 0.025") has glazing of "1" while test 6-0945 with 3% CNSL (F.L.T.=0.025") has a glazing of of "3". Both formulations consist of the formulation which includes silicone resin, cotton fibers, Kevlar® fibers, celite, and carbon fibers, plus phenolic resin or CNSL particles. The amount of CNSL particle used in a formulation is balanced between reducing assembly wear and reducing assembly glazing. If the end use application requires that the friction material withstand high energy and temperatures, then the CNSL particle can be replaced with particles that have more thermal capacity. If the end use application calls for moderate energy and temperature levels (within the range produced from the 528C procedure) then the use of CNSL particles is appropriate and suitable since glazing is typically not a concern at such moderate operating conditions.

Material HS-110-90, with phenolic powder (3%) and no CNSL, has a glazing ranking of "1" when the final lining thickness is 0.025", see test 6-0942 in Table 3 in Example 1 above. When this same material (HS-169-90) is compressed to a final lining thickness of 0.020", the glazing ranking increases to "4", see test 6-0990.

When the phenolic powder content is increased to 5% the 0.025" final lining thickness material has a glaze ranking of "2", see test 6-1037. When the same material (HS-168-90), which contains no particle, is compressed to a final lining thickness of 0.020", as in test 6-1036, the glazing ranking is "4".

With the addition of 2% silicon nitride particle into the formulation, the glazing of 0.025" final lining thickness material is ranked "3". This similar to the subjective "2"

ranking HS-168-90 received without 4198 particle. When compression is increased to 0.020", the glaze ranking still remains "3".

However, when CNSL particle is added to the formulation which contains 3% phenolic powder, the glaze ranking increased from a "1" (see test 6-0995 with HS-110-90 at 0.025" final lining thickness) to a "3". When RHS-20-91 is compressed to a final lining thickness of 0.020", the glaze ranking remains a "3".

The amount of phenolic powder, the amount of CNSL particle, and the amount of compression (or final lining thickness) contribute to the degree of glaze formation on an assembly surface.

EXAMPLE 2C

Friction band tests were performed with the materials HS-169-90, HS-168-90, and HS167-90. The friction band testing of materials establishes a correlation in testing procedures between clutch plate tests and band tests.

The three materials have a friction coefficient that may be sensitive to interface temperature: dynamic friction coefficients of 0.143 to 0.150, and static friction at 250° F. ranges from about 0.123 to 0.155 depending upon the time lag of engagement.

The friction band test conducted with the production SD1777-B material, performed in Exxon 1931, results in dynamic and static friction coefficients of 0.137 and 0.104, respectively. The LVFA tests were performed to verify this temperature sensitivity. A static to dynamic (S/D) friction coefficient ratio close to 1.0 is preferred for band applications.

Low Velocity Friction Apparatus (LVFA) tests were performed to verify the changes in friction coefficient at different temperatures in three different lubricants. Referring now to Table VII below, the lubricants used were (1) Texaco 1825 5286, (2) Exxon 1931, and 3) Exxon 1975.

TABLE VII

Low Velocity Friction Apparatus Data

| Material | 300° F. Static/ Dynamic | 200° F. Static/ Dynamic | 100° F. Static/ Dynamic | Lining Wear (mil) |
|---|---|---|---|---|
| HS-169-90 (Example 2-1) | | | | |
| Texaco 1825 5286 "Dexron II" | .155/.181 | .167/.151 | .200/.145 | * |
| Exxon 1931 "Dexron IIE" | .131/.177 | .148/.151 | .184/.154 | * |
| Exxon 1975 Type "H" | .115/.164 | .131/.158 | .153/.163 | 1.7 |
| HS-168-90 (Example 2-3) | | | | |
| Texaco 1825 5286 "Dexron II" | .153/.164 | .153/.139 | .186/.139 | * |
| Exxon 1931 "Dexron IIE" | .137/.178 | .143/.154 | .181/.153 | * |
| Exxon 1975 Type "H" | .118/.167 | .131/.165 | .150/.169 | 1.3 |
| HS-167-90 (Example 2-5) | | | | |
| Texaco 1825 5286 "Dexron II" | .160/.179 | .168/.155 | .201/.154 | * |
| Exxon 1931 "Dexron IIE" | .139/.179 | .152/.155 | .192/.160 | * |
| Exxon 1975 Type "H" | .114/.159 | .127/.160 | .150/.161 | 2.6 |
| SD1777 (Lab. No. M-5035) | | | | |
| Texaco 1825 5286 "Dexron II" | .129/.166 | .157/.155 | .179/.158 | * |

TABLE VII-continued

Low Velocity Friction Apparatus Data

| Material | 300° F. Static/ Dynamic | 200° F. Static/ Dynamic | 100° F. Static/ Dynamic | Lining Wear (mil) |
|---|---|---|---|---|
| Exxon 1931 "Dexron IIE" | .122/.163 | .135/.148 | .161/.155 | * |
| Exxon 1975 Type "H" | .107/.151 | .107/.145 | .134/.153 | 1.0 |

*Dimensional lining changes not recorded after test.

Materials Lubricated with Texaco 1825 5286—Dexron II

Static friction: The three materials, and the production SD1777 material all have static friction coefficients that drop as lubricant reservoir temperature is increased. At 300° F. the SD1777 material resulted in a static friction coefficient of about 0.13, while the other materials produced a 20% higher value of 0.156.

The highest static friction coefficient (0.160) was produced with HS-167-90 which has silicon nitride particles in its formulation. The material with the lowest static friction coefficient (0.153) results with HS-168-90. This material has the most stable static friction of the friction materials. This material has the highest amount of phenolic powder added into its formulation.

Dynamic friction: The three materials, and the production SD1777 material (which is a banded complete clutch plate with the 652C material) all have dynamic friction values that increase as lubricant temperature increases. The production SD1777 material has the smallest 5-7% fluctuation in dynamic friction coefficient when lubricant reservoir temperature changes. There is a large 15-20% fluctuation in friction coefficient of the experimental materials when the lubricant temperature is changed. All the materials result in lower S/D ratios when higher lubricant reservoir temperatures are utilized.

At the evaluated lubricant temperature of 300° F., two of the three materials have high dynamic friction. The materials with low phenolic content (HS-169-90), and the addition of silicon nitride particles (HS-167-90), have a high 0.180 dynamic friction coefficient of 300° F.

Lining materials with higher phenolic content tend to have a less fluctuating static and dynamic friction coefficient when lubricant reservoir temperature changes. A high silicone resin content material results in high friction coefficients.

Materials Lubricated with Exxon 1931—Dexron IIE

The materials performed with higher friction coefficients than SD1777. Tests lubricated with Exxon 1931 Dexron IIE perform with lower static values and slightly lower dynamic values, compared tests lubricated with Texaco 1825 5286 Dexron II.

Static friction: All material have dropping static friction coefficients as lubricant reservoir temperature is increased. The additive package in the lubricant is more effective at suppressing friction at elevated temperatures. The production SD1777 material resulted in a 300° F. coefficient of 0.12, while the other materials produced a 10% higher 0.136 value.

When lubricant reservoir temperature changes, the HS-168-90 material has slightly less percent static friction fluctuation compared to the other materials.

The HS-167-90 material with silicon nitride particles has the highest static friction coefficient at 200° F. and 100° F.

lubricant reservoir temperatures. The silicon nitride particles in this material partially prevent the lubricant additive package from suppressing friction.

Dynamic friction: The three materials, and the production SD1777 material all have dynamic friction coefficients that increase as lubricant temperature increases. The production SD1777 material has a dynamic friction coefficient that fluctuates about 5–10% with changing lubricant reservoir temperatures. A 10–20% dynamic friction fluctuation results with the other materials. These other materials averaged a 0.178 dynamic friction at 300° F., which is about 9% higher than the SD1777 production material.

Materials Lubricated with Exxon 1975—Type "H" Static friction: Between 100° F. and 300° F. reservoir temperatures, all the friction materials exhibit approximately a 20% friction fluctuation. The SD1777 material is a constant 0.107 between 200° F. and 300° F. The other materials repeatedly have at least 10% more friction fluctuation.

Dynamic friction: Friction stability results are substantially improved with the Exxon 1975 Type "H" fluid, compared those with the Dexron "IIE" and Dexron "IIE" fluids. All the materials have less than 5% dynamic friction fluctuation over the temperature range studied.

EXAMPLE 2D

The RHS-20-91 material was evaluated with Exxon 1975 Type "H" lubrication wherein the test procedure specifies a 700° F. interface temperature between the steel and friction material.

After 9600 cycles the RHS-20-91 material exhibited 13.8% dynamic friction fade. Fade was calculated using the 0.152 coefficient at cycle 200 as the initial friction value. The material finished the test, but wore between cycles 9600 and 10,000. Total pack loss was 0.069".

Full Pack Testing: In the moderate energy (1.2 Hp) tests, the silicone-phenolic non-saturated friction materials performed with 17% higher dynamic friction coefficient that the SD1777 production material. Pack loss and the percent friction fade are reduced when phenolic powder, CNSL particles, and silicon nitride particles are included in the raw paper formulations which contain silicone resin. The largest reduction in wear results when the lining material is compressed to a 84.7 density. At a high density the experimental materials have twice the wear resistance of the production material.

The RHS-20-91 material maintains relatively stable friction performance in the 700° F. interface temperature tests for 9600 cycles.

The LVFA testing indicates that the dynamic friction of high silicone materials fluctuate approximately 10% more than the phenolic material when the lubricant reservoir temperature is changed. A 10% larger friction fluctuation is noticed in both Texaco 1825 5286 and Exxon 1931 lubricated systems. The sensitivity to reservoir temperature changes are less pronounced in an Exxon 1975 Type "H" lubricated system.

EXAMPLE 3

Friction materials were made with a powdered silicone-phenolic resin system. The resins are placed into the wet slurry before the paper is formed. A resin mixture comprising about 30% silicone ER84002 powder and about 5% phenolic PB206 powder was used. The materials were cured for 120 minutes at 400° F. The friction materials saturated with the liquid phenolic resin were cured for 30 minutes at 350° F. All the materials were bonded, wire side up, to form an assembly part. Assemblies were submitted for clutch pack tests according to the moderate and high energy procedures 528 and 527. All tests were performed with Exxon 1975 Type "H" lubrication. The hand sheet formulations are listed below:

All hand sheets were finished wire side up to a final lining thickness (F.L.T.) of 0.020" and were made at about 200# base weight (BW).

| | |
|---|---|
| RHS-124-91 | cotton fibers/Kevlar ® fibers/celite/CNSL |
| Example 3-1 | particles/elastomeric (polymer) particles/$Si_3N_4$ particles/silicone resin (30%)/phenolic (5%) resin |
| RHS-121-91 | cotton fibers/Kevlar ® fibers/celite/graphite |
| Example 3-2 | particles/carbon fibers/silicone resin (30%)/phenolic (5%) resin |
| RHS-107-91 | cotton fibers/Kevlar ® fibers/silica |
| Example 3-3 | particles/elastomeric (polymer) particles/glass fibers/silicone resin (30%)/phenolic (5%) resin |
| RHS-105-91 | cotton fibers/Kevlar ® fibers/celite/graphite |
| Example 3-4 | particles/silicone resin (30%)/phenolic (5%) resin |
| RHS-103-91 | cotton fibers/Kevlar ® fibers/celite/CNSL |
| Example 3-5 | particles/$Si_3N_4$ particles/silicone resin (30%)/phenolic (5%) resin |

EXAMPLE 3A.

The powdered silicone-phenolic resin system is compatible with a variety of raw paper material formulations. The powdered resin bonds well with an assortment of fiber and particles. This Example shows that the powdered resin system is applicable to high energy (Example 3-2), and high friction (Example 3-5), material formulations alike. Testing with these five material formulations indicates that the powder resin system is workable with a wide range of materials such as graphite, carbon, cotton, and other ingredients, as shown in Table VIII below, The assemblies successfully completed the moderate test procedure, with no catastrophic lining delamination or surface abrasion. Friction Coefficient Assemblies with two materials, Example 3-5 and Example 3-1, tested with high 0.184 dynamic friction coefficient, but also higher pack loss. However, although these assemblies resulted in 0.018 to 0.026 inches of pack loss, the percent friction fade was low. The Example 3-5 material had only 6.1% friction fade, and is suitable for a high friction, low energy end use application.

Of the five material formulations evaluated with a non-saturated resin system, the Example 3-1 material (6-1144) tested with the lowest (3.2%) dynamic friction fade. This test resulted in a dynamic friction coefficient of 0.183 and a 0.82 S/D ratio. However, the pack loss of 26 inches was high, and the surface appearance rankings indicated that the large amount of cashew shell nut liquid did not bond well with silicone powder resin.

Figure 13:
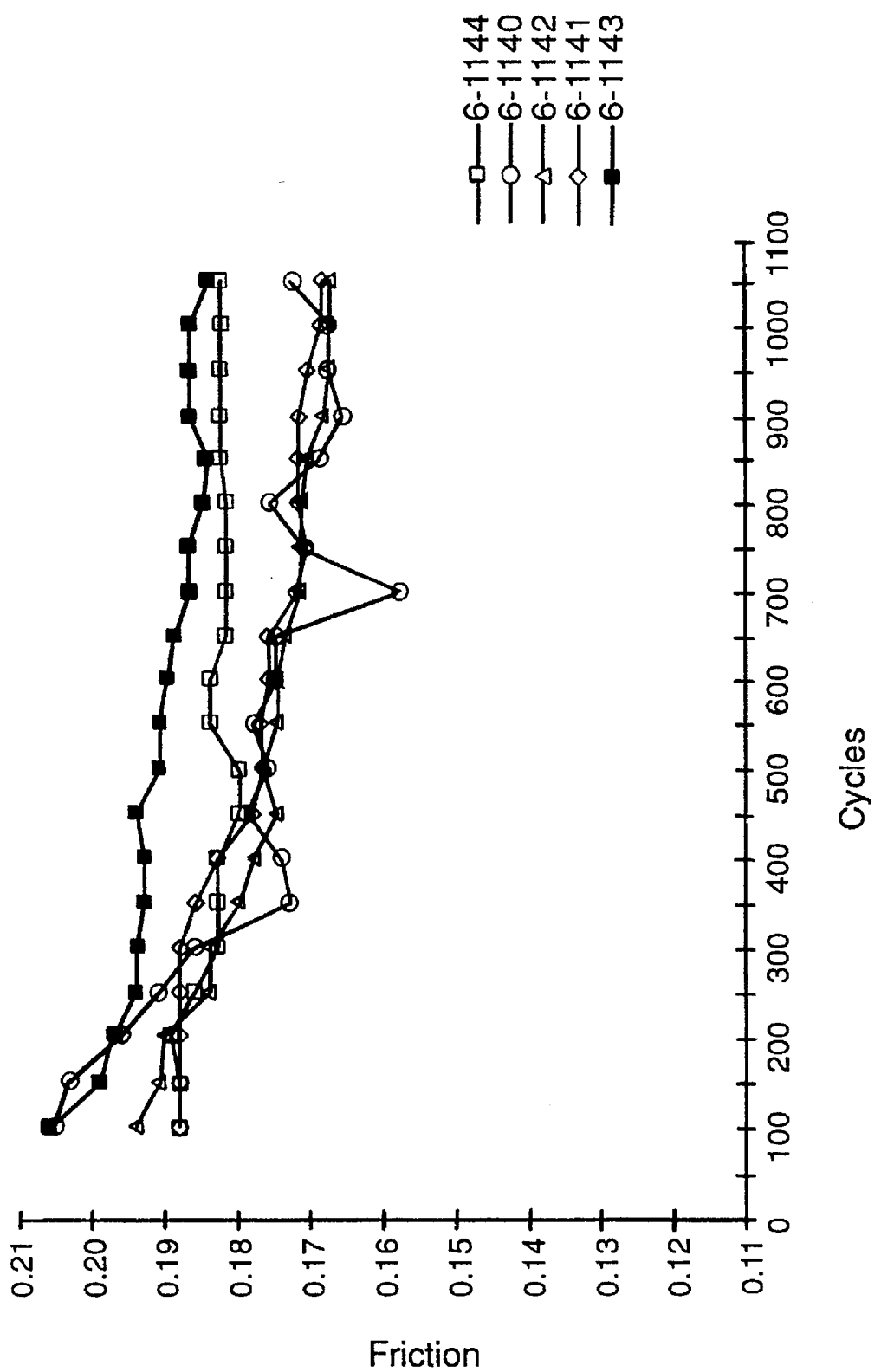
FIG. 13 is a graph comparing the coefficient of friction as the number of cycles increases for various formulations shown in Table 9.

Tests with the other three materials, Examples 3-2, 3-4, and 3—3, resulted in approximately a 0.170 dynamic coefficient, with an 11% dynamic friction fade. The Examples 3—3, 3-2 and 3-4 materials resulted in 3.2 mils, 8.4 mils, and 13.0 mils pack loss, respectively. All three materials had excellent assembly surface appearance. FIG. 13 is a graph illustrating the combined friction versus cycle for the above mentioned tests.

All the assemblies tested produced a static to dynamic (S/D) ratio less than one, which implies a descending friction versus speed curve. (Static coefficient is used here synonymously with the term "low speed dynamic.") The S/D ratios ranged from 0.98 to 0.87. Low S/D ratios are typical of smooth shifting clutches.

The assembly conditions for each formulation were evaluated. Low pack loss of 3.2 mils and 8.4 mils resulted from tests with the Example 3—3 (test 6-1142) and Example 3-2 (test 6-1140) formulations, respectively. Both materials had a high speed dynamic friction coefficient of approximately 0.170. The assembly surface conditions were excellent after the test. While the Example 3-2 type material had a surface glaze ranking of "3," all other appearance rankings of abrasion, breakout, and delamination were "0." Glaze and abrasion were ranked "1" for the Example 3—3 material, other appearance rankings were "0." Under the test conditions of the 528 procedure, the Example 3—3 assemblies had the lowest wear.

The Example 3-4 (6-1141) material tested with 13.0 mils of pack loss. The assemblies produced a high speed dynamic friction coefficient of approximately 0.170, and had a glazing ranking of "2." All other surface rankings of this pack were "0".

The Example 3-5 material resulted in 17.9 mils pack loss, and assembly surface appearance rankings of "1" for abrasion and glaze. Other surface appearance rankings were "0".

TABLE VIII

Full Pack Laboratory Data - 1050 Cycle
Exxon 1975 Type "H" ATF - Procedure 528
Non-Saturated Resin System - 30% ER84002 & 5% PB206
Wire Side Up - F.L.T. = 0.020"

| Material Formulation | Fric. ui (a) | Fric. ud (b) | Fric. us (c) | Pack Loss (mils) | Percent Fade (d) | Assembly Rank (e) |
|---|---|---|---|---|---|---|
| Example 3-2 Test 6-1140 | 0.173 | 0.157 | 0.144 | 8.4 | 11.7 | 0,0,3,0 |
| Example 3-4 Test 6-1141 | 0.169 | 0.156 | 0.147 | 13.0 | 10.1 | 0,0,2,0 |
| Example 3-3 Test 6-1142 | 0.168 | 0.157 | 0.146 | 3.2 | 11.6 | 1,0,1,0 |
| Example 3-5 Test 6-1143 | 0.185 | 0.167 | 0.148 | 17.9 | 6.1 | 1,0,1,0 |
| Example 3-1 Test 6-1144 | 0.183 | 0.168 | 0.150 | 26.0 | 3.2 | 1,2,3,3 |

(a) Fric. ui is the dynamic friction coefficient at high speed.
(b) Fric. ud is the midpoint friction coefficient.
(c) Fric. us is the slow speed friction coefficient, as per drawing 95407 Rev. B.
(d) Percent friction fade (using ui) is calculated between cycles 200 through 1050.
(e) Assembly rank values given are abrasion, breakout, glazing, and delamination, respectively.

EXAMPLE 3B

Figure 14:
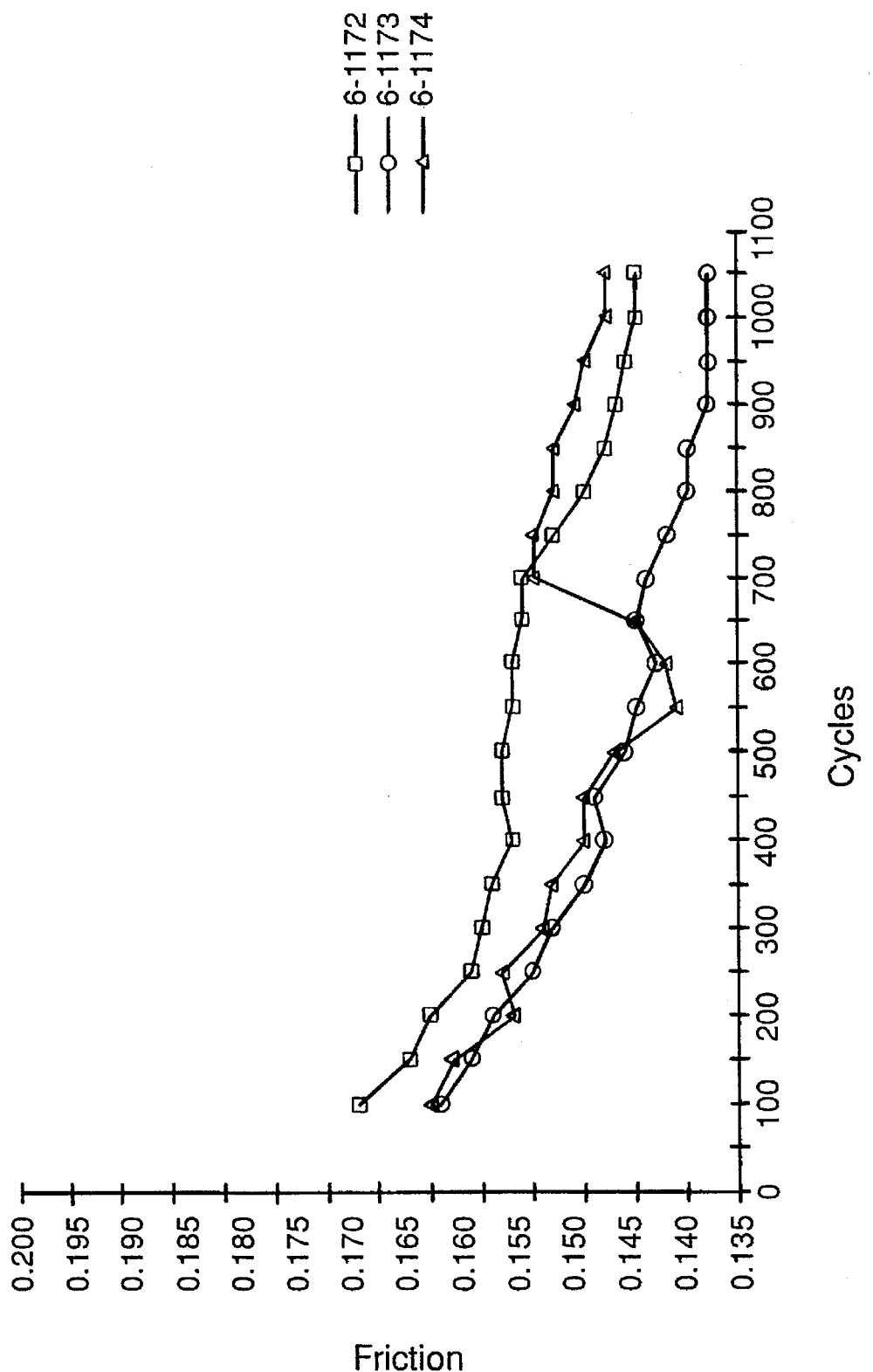
FIG. 14 is a graph comparing the coefficient of friction as the number of cycles increases for various formulations shown in Table 10.

Four sets of assemblies with the powder resin silicone-phenolic system of the present invention were subjected to a higher energy test. Three non-saturated materials passed the test successfully, and maintained a descending engagement curve shape. The static to dynamic (S/D) friction ratios are less than "1. " Results from the high energy test are given in Table IX below. A comparison of the friction versus number of cycle is shown in FIG. 14.

The Example 3—3 material finished the test with a 0.133 dynamic friction coefficient after a 13.6% fade. The pack appearance was excellent after the completion of the test. All appearance ranking were "0," except glazing which was only "2. "

The non-saturated resin system is compatible with a variety of friction material formulas. High energy Examples 3-2 and 3-4 materials, in addition to three other formulations, performed well with the non-saturated resin system. In the moderate energy (procedure 528) test the dynamic friction coefficient was high (0.17–0.18), static to dynamic ratio was low (<0.87), and assembly surface appearance was good after test.

The Examples 3—3, 3-2 and 3-4 materials finished the high energy 527 test procedure. All had excellent assembly surface condition. The lowest wear of 16.2 mils resulted from the test with the Example 3—3 material. The assemblies with the Example 3—3 had no abrasion, breakout, or delamination.

TABLE IX

Full Pack Laboratory Data - High Energy
Exxon 1975 Type "H" ATF - Procedure 527
Non-Saturated Resin System - 30% ER84002 & 5% PB206
Wire Side Up - F.L.T. = 0.020"

| Material Formulation | Fric. ui (a) | Fric. ud (b) | Fric. us (c) | Pack Loss (mils) | Percent Fade (d) | Assembly Rank (e) |
|---|---|---|---|---|---|---|
| Example 3-2 Test 6-1172 | 0.140 | 0.142 | 0.136 | 34.9 | 12.5 | 1,0,4,2 |
| Example 3-4 Test 6-1174 | 0.143 | 0.141 | 0.133 | 34.0 | 5.9 | 0,1,3,0 |
| Example 3-3 Test 6-1173 | 0.133 | 0.126 | 0.121 | 16.2 | 13.6 | 0,0,2,0 |
| Example 3-5 Test 6-1175 | 0.167 (@ 450) | 0.161 (@ 450) | 0.165 (@ 450) | NA | NA | NA |
| Example 3-1 NA | | | | | | |

(a) Fric. ui is the dynamic friction coefficient at high speed.
(b) Fric. ud is the midpoint friction coefficient.
(c) Fric. us is the slow speed friction coefficient.
(d) Percent friction fade (using ui) is calculated between cycles 200 through 1050.
(e) Assembly rank values given are abrasion, breakout, glazing, and delamination, respectively.

INDUSTRIAL APPLICABILITY

The present invention is useful as a high energy friction material for use with clutch plates, transmission bands, brake shoes, synchronizer rings, friction disks or system plates.

The above descriptions of the preferred and alternative embodiments of the present invention are intended to be illustrative and are not intended to be limited upon the scope and content of the following claims.

I claim:

1. A non-asbestos friction material for use in a wet environment a porous fibrous base material formed from an aqueous paper slurry formulation having incorporated therein at least one powdered silicone resin and at least one powdered phenolic resin, the powdered silicone resin and powdered phenolic resin being dispersed throughout the fibrous base material, such that the friction material exhibits high heat resistance and a substantially uniform coefficient of friction, wherein the phenolic resin is present in an amount of about 3 to about 80%, by weight, and the silicone resin is present in an amount of about 25 to about 55%, by weight, in the fibrous base material based on the weight of the fibrous base material.

2. The friction material of claim 1, wherein the fibrous base material further comprises about 2 to about 25%, by wt., silicon nitride particles based on the weight of the aqueous slurry formulation for the fibrous base material.

3. The friction material of claim 2, wherein the porous fibrous base material further comprises about 3 to about 25%, by wt., cashew nut shell liquid particles based on the weight of the aqueous slurry formulation for the fibrous base material.

4. The friction material of claim 3, wherein the fibrous base material comprises aramid pulp and/or fibers and cotton fibers.

5. The friction material of claim 4, wherein the fibrous base material is formed from an aqueous slurry formulation which comprises about: 3–70%, by weight, aramid pulp, floc and/or fibers; 5–70%, by weight, cotton fibers; 5–70%, by weight, filler material; 25–55%, by weight, silicone resin; 3–80%, by weight, phenolic resin; 3–25%, by weight, cashew nut shell liquid particles; and, 2–25%, by weight, silicon nitride powder, based on the weight of the aqueous slurry formulation for the fibrous base material.

6. The friction material of claim 5, wherein the fibrous base material comprises about 3–10%, by weight, aramid pulp, floc and/or fibers; 30–50%, by weight cotton fibers; 10–30%, by weight, filler material; 25–55%, by weight, silicone resin; 5–15%, by weight, phenolic resin; 3–15%, by weight, cashew nut shell liquid particles; and, 2–7%, by weight, silicon nitride powder.

7. A process for producing a non-asbestos friction material comprising adding at least one silicone resin and at least one phenolic resin to an aqueous paper slurry formulation, forming a porous fibrous base material, wherein the silicone resin and the phenolic resin are dispersed throughout the fibrous base material, and wherein the phenolic resin is present in an amount of about 3 to about 80%, by weight, and the silicone resin is present in an amount of about 25 to about 55%, by weight, in the fibrous base material based on the weight of the fibrous base material, and heating the fibrous base material to cure the phenolic resin and the silicone resin to form the friction material.

8. The process of claim 7, wherein the fibrous base material further comprises about 2 to about 25% by wt., silicon nitride particles based on the weight of the aqueous slurry formulation for the fibrous base material.

9. The process of claim 8, wherein the fibrous base material further comprises about 3 to about 25%, by wt., cashew nut shell liquid particles based on the weight of the aqueous slurry formulation for the fibrous base material.

10. The process of claim 9, wherein the fibrous base material comprises aramid pulp and/or fibers and cotton fibers.

11. The process of claim 10, wherein the fibrous base material comprises about: 3–70%, by weight, aramid pulp, floc and/or fibers; 5–70%, by weight, cotton fibers; 5–70%, by weight, filler material; 25–55%, by weight, silicone resin; 3–80%, by weight, phenolic resin; 3–25%, by weight, cashew nut shell liquid particles; and, 2–25%, by weight, silicon nitride powder, based on the weight of the aqueous paper slurry formulation for the fibrous base material.

12. The process of claim 11, wherein the fibrous base material comprises about: 25–55%, by weight, silicone resin; 5–15%, by weight, phenolic resin; 3–15%, by weight, cashew nut shell liquid particles; and, 2–7%, by weight, silicon nitride powder.

13. The process of claim 7, wherein the friction material is compressed to a density between about 45 to about 85, wherein density is defined as density of the friction material equaling the basis weight of raw material in lb./3000 sq. ft. times 1/FLT wherein FLT—final lining thickness of cured friction material in inches (after being cured and compressed) times (1 +percent resin pick-up) times 0.004.

14. The product produced by the process of claim 7.

15. A friction element according to claim 1 in the form of a clutch facing.

16. A friction element according to claim 4 in the form of a clutch facing.

17. A friction element according to claim 1 in the form of a brake shoe lining.

18. A friction element according to claim 4 in the form of a brake shoe lining.

19. The friction material of claim 1, wherein the friction material is compressed to a density between about 45 to about 85, wherein density is defined as density of tile friction material equaling the basis weight of raw material in lb./ 3000 sq. ft. times 1/FLT wherein FLT—final lining thickness of cured friction material in inches (after being cured and compressed) times (1+ percent resin pick-up) times 0.004.

* * * * *